United States Patent [19]

Uchiyama et al.

[11] 4,005,444
[45] Jan. 25, 1977

[54] EXPOSURE CONTROL SYSTEM FOR FLASH PHOTOGRAPHY

[75] Inventors: Takashi Uchiyama, Yokohama; Yukio Mashimo, Tokyo; Tetsuya Taguchi, Kawasaki; Zenzo Nakamura, Urawa, all of Japan

[73] Assignee: Canon Kabushiki Kaisha, Tokyo, Japan

[22] Filed: July 15, 1974

[21] Appl. No.: 488,441

Related U.S. Application Data

[63] Continuation of Ser. No. 399,743, Sept. 21, 1973.

[30] Foreign Application Priority Data

Sept. 25, 1972 Japan .............................. 47-95998
Dec. 27, 1972 Japan .............................. 48-3923

[52] U.S. Cl. ............................... 354/27; 354/33; 354/35; 354/60 F; 354/139; 354/149
[51] Int. Cl.² ..................... G03B 7/14; G03B 7/16
[58] Field of Search ................. 354/27, 32, 33, 35, 354/60 R, 60 F, 126, 129, 139, 149

[56] References Cited

UNITED STATES PATENTS

| 3,710,701 | 1/1973 | Takishima et al. ................. 354/126 |
| 3,836,920 | 9/1974 | Uchiyama et al. ................... 354/27 |

FOREIGN PATENTS OR APPLICATIONS 46-43185  12/1971  Japan .................................. 354/32

Primary Examiner—Russell E. Adams, Jr.
Attorney, Agent, or Firm—Toren, McGeady and Stanger

[57] ABSTRACT

A photographic flash exposure control system for a camera associated with a flash device. In conformance with a preselected shutter interval, an effective exposure aperture of a diaphragm device is computed by a computing circuit of the system. The total flash energy available from the flash device is automatically controlled in accordance with the luminance of the subject being photographed, to thereby provide correct exposure for complex lighting situations.

32 Claims, 23 Drawing Figures

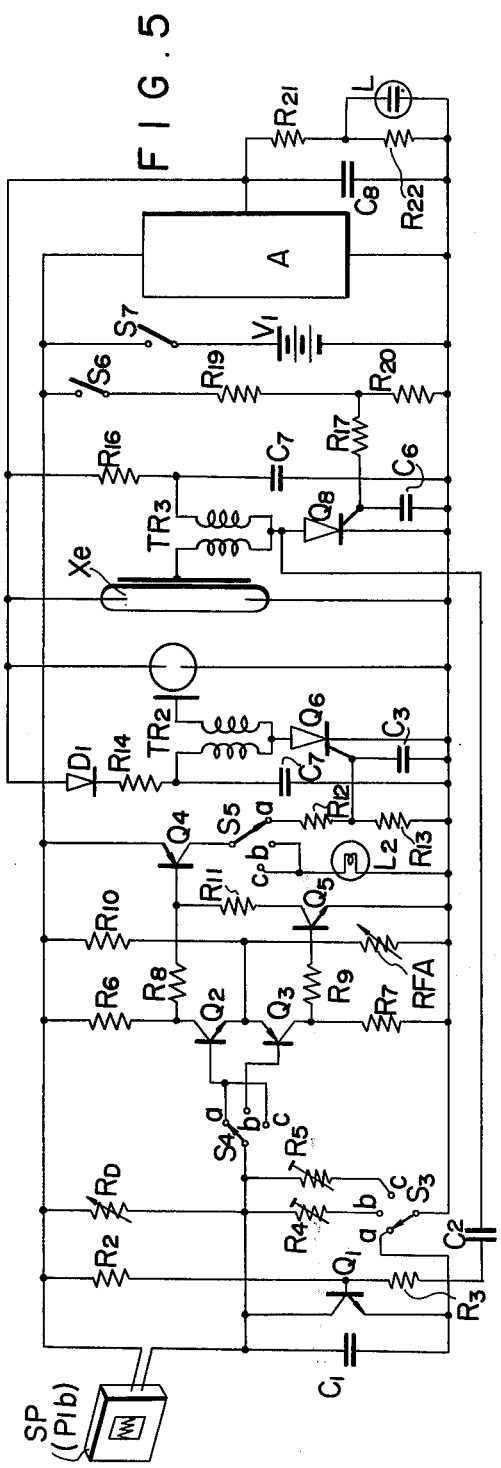
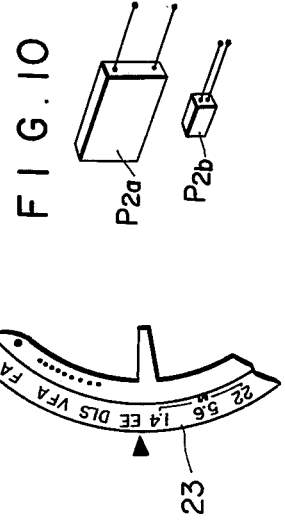
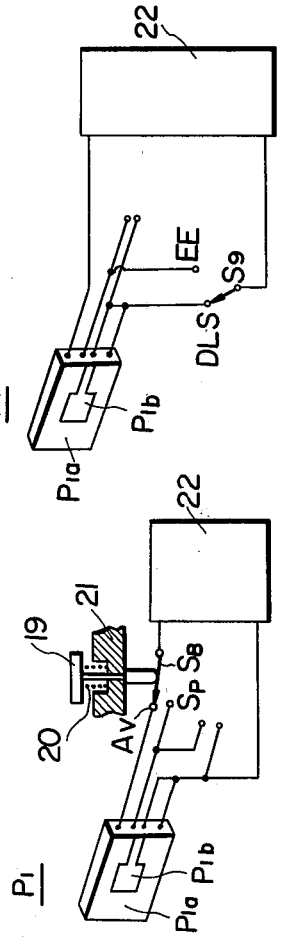

EXPOSURE CONTROL SYSTEM FOR FLASH PHOTOGRAPHY

This is a Continuation of application Ser. No. 399,743, filed Sept. 21, 1973.

DETAILED EXPLANATION OF THE INVENTION

This invention relates to an exposure interval preselection exposure control system for flash photography under daylight illumination, and it contemplates the use of an automatic exposure control apparatus which, in response to the preselected exposure interval, derives appropriate exposure values for natural ambient illumination together with a flash device of the type capable of variation of the total flash energy in accordance with the flash source-to-subject distance and the exposure aperture effected by the automatic exposure control apparatus. The system is capable, in flash photography under natural ambient bright illumination and especially in flash photography under bark-lighting illumination for subjects of principal photographic interest having luminance levels lower than that of the background scene, of evaluating the complex lighting situations to derive exposure values appropriate not only for the subjects but also for the background scene.

Flash devices of the type wherein the light reflection from objects being photographed in flash mode is integrated by using a photoresponsive element of rapid response and an integrator circuit, and when the total flash energy reached a predetermined level, the energization of the flash bulb is terminated, are already known as the so-called "computer stroboscope". However, the drawback of this type is that because of the neglect of the ambient natural light during the flash exposure, overexposure might result if the intensity of illumination of the objects is relatively high and the time interval of exposure is long.

A known prior art exposure control system, in order to remove the above-mentioned drawback, has taken into account the contribution of ambient natural illumination by the incorporation of a low-pass filter and by-pass filter in the control circuit to derive corrected exposure values, which is used to conrol the time interval of flash illumination or the total flash energy. However, drawbacks of such a system are such that the control circuit is complicated, and when another photographer flashes another flash tube, an over-exposure results.

Turning now to the system of the present invention, a camera incorporating the automatic exposure control apparatus and a flash device of the type described may be arranged with each other either as a unit, or as independent components. In the latter case, for the purpose of making the system responsive to the luminance of the subject of principal interest in order to increase the accuracy of exposure values, it is preferred for the reduction of cost of the camera itself to incorporate the photoresponsive element into the flash device. Further, in some of the flash photographic situations, it happens that the light energy available from the flash source is too small or too large for the evaluation ability of the system to derive appropriate flash exposure values in response to the shutter speed, scene luminance, subject distance and film sensitivity. Taking into account such extreme cases, therefore, the system of the invention is provided with a warning means and other safety means such as those for setting the shutter mechanism from the preselected position to a different one, so that the system is made responsive to as wide a range of photographable situations as possible, and derives as appropriate exposure values as possible.

In addition to these features, according to another aspect of the present invention, the flash exposure control system constructed in accordance with the invention has advantages deriving from its novel construction which permits the integration of light reflection from the subject illuminated by both ambient natural light and flash light from the instant at which the shutter is opened to the instant at which the energization of the flash tube is terminated by the flash energy control circuit when the integrated reflection has reached a predetermined level to control the exposure interval. In this arrangement, the flash tube is triggered just before the shutter is closed, so that the above-mentioned conventional drawback of effecting overexposure due to the neglect of the intensity of ambient illumination is overcome. Accordingly, the complexity of the flash energy control circuit is reduced, and the system of the invention has a very high utility.

A further advantage of the present invention is that when an additional flash illumination is unexpectedly generated from flash sources of other photographers, in response to the additional flash illumination, the exposure control system reduces the total flash energy available from its own flash device to derive consistent exposure values. The last advantage is not known in any of the prior art systems.

Other features and advantages will be understood from the following detailed description of certain specific embodiments of the invention with reference to the accompanying drawings, in which:

FIGS. 4, 5 and 6 are diagrams of the flash energy control circuit of a stroboscopic unit for use in the present invention.

FIGS. 7 and 8 are fragmentary partly diagrammatic and partly perspective views of the circuit shown in FIG. 3 with modifications.

FIG. 9 is a front view of part of the camera structure shown in FIG. 2 with a modification.

FIG. 10 is a perspective view of a photoresponsive element arrangement adapted for use in the circuit shown in FIG. 3.

Figure 1:
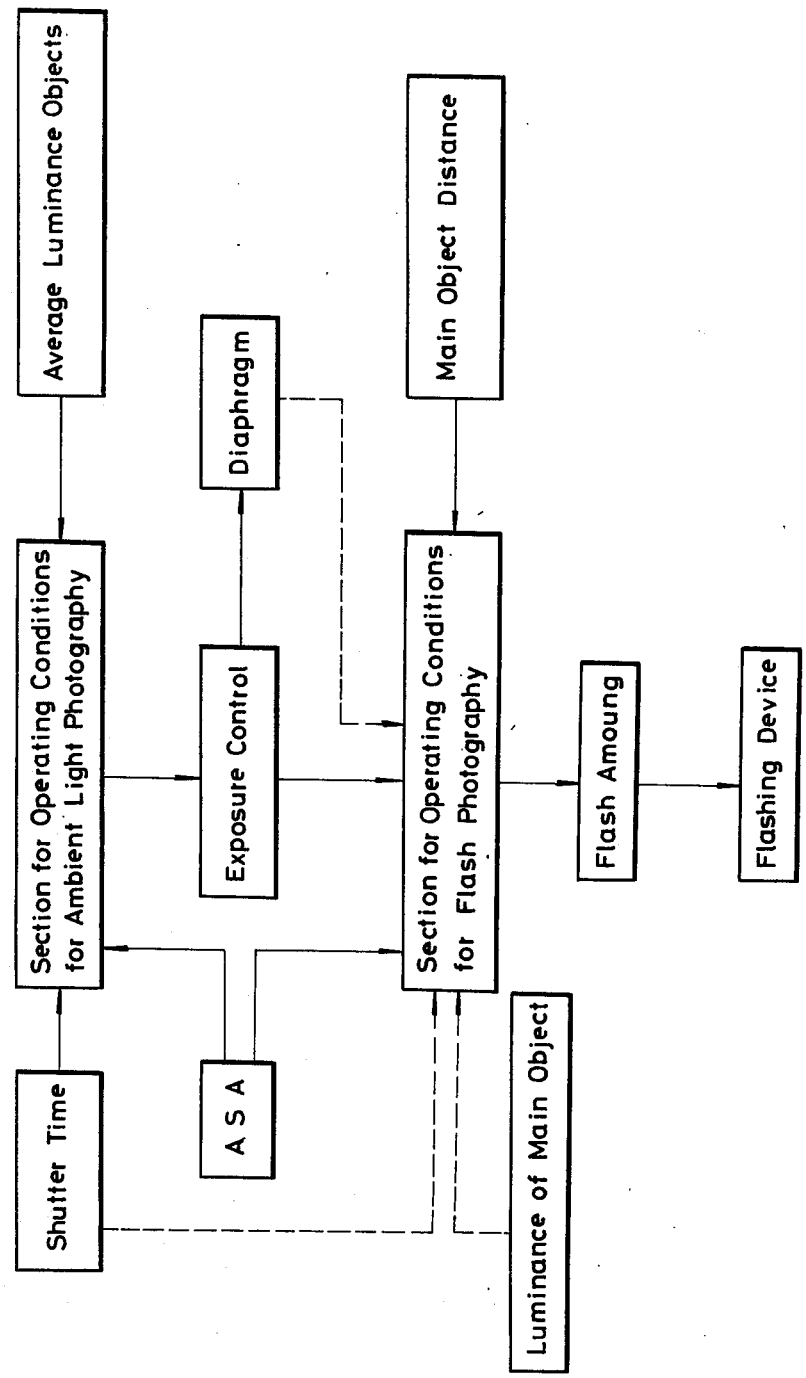
FIG. 1 is a schematic representation of an exposure control system according to the present invention.

The photographic information transmission paths shown in FIG. 1 may be considered to be one practical example of the system disclosed in Japanese Patent Application Sho 47-16166 of the present patent applicant.

In order to set the system for a given photographic situation under ambient natural illumination, a shutter speed setting along with a film sensitivity or ASA setting and an average object luminance setting are inserted into the normal exposure control circuit section. What is referred to as "average object luminance" is to be described later in connection with the photoresponsive element again, but may be herein defined as an average luminance of the whole of the objects to be photographed imaged onto one film frame; in other words, an average luminance of the objects other than the subject of principal photographic interest which is usually positioned at the central part of the film frame, that is, an average luminance of the environment of the subject. Responsive to the input signals representing such photographic informations, i.e. shutter speed, film sensitivity and average object luminance informations, the normal exposure control circuit section derives as an output an exposure value, to a conformance with which the exposure aperture is adjusted. By inserting the exposure aperture setting to the diaphragm device of the camera, a correct exposure can be made for the given photograhic situation.

On the other hand, inserted to the flash exposure control circuit section are the subject distance setting as well as the ASA setting. The subject distance should be referred in the strict sense to the distance between the flash source and the subject, but may be replaced by the camera-to-subject distance except close picture taking situations, because the flash device is used usually as located near the camera even when the system comprises separated components. If the distance between the camera and flash device is always constant, it may be utilized in the added or subtracted form for the modification of the camera-to-subject distance evaluated by the focus adjustment of the photographic lens to obtain the accurate subject distance information to which the flash exposure control circuit section may be set. In addition to these two settings, the exposure aperture setting, from which the exposure value is derived in the former circuit section, is also inserted in the latter circuit section which in turn derives a flash exposure value which is used to control the flash energy available from the flash device to effect correct exposure for the subject of principal interest. To insert the exposure aperture setting in the latter exposure control circuit section, the means for setting the derived exposure aperture may be linked with the diaphragm aperture adjusting device of the camera as indicated by the broken lines in the figure so that when the shutter is released, the adjusted exposure aperture is utilized. Furthermore, the shutter speed setting and subject luminance setting, besides the above-mentioned three settings may be inserted in the latter section in order to modify the flash energy setting. This modification prevents overexposure of the luminance of the subject from resulting when the intensity of ambient natural illumination of the subject is negligible as compared with the intensity of the flash, for example, when the light-reflective subject is located at a relative long distance.

Figure 2:
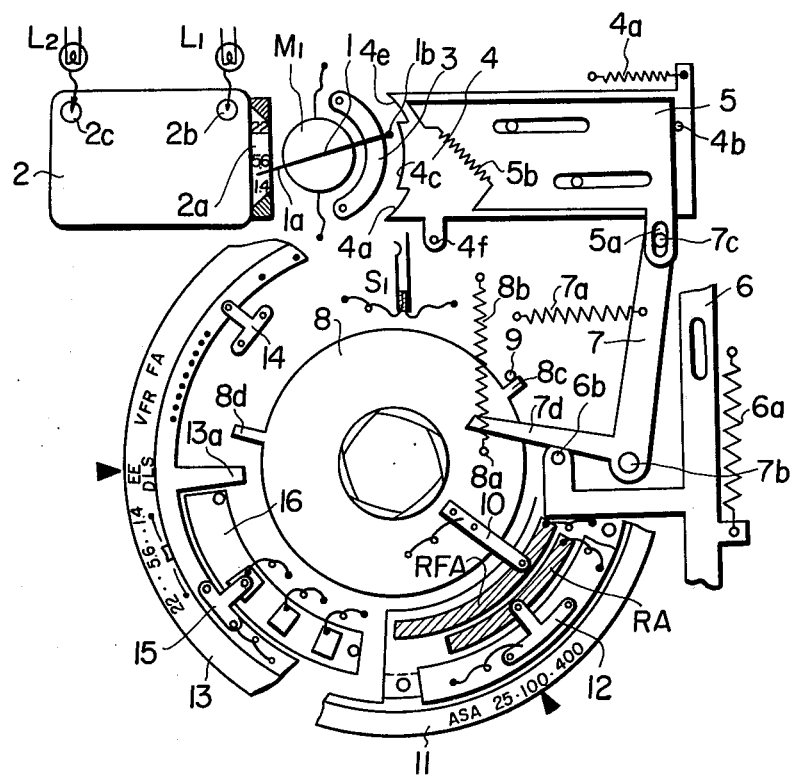
FIG. 2 is a fragmentary front elevational view, partly broken away, of an exposure control system representing one structure of a camera by which the present invention may be implemented.

FIG. 2 is a fragmentary front elevational view of an automatic exposure control apparatus constituting part of the exposure interval preselection exposure control system for flash photography under ambient natural illumination which embodies the present invention. The automatic exposure control apparatus is of the conventional structure in the basic form using an ammeter $M_1$ and a slide 5 having a toothed portion 5b. A needle 1 of the ammeter $M_1$ has two arms 1a, 1b, one of which projects over the aperture value scale under the window 2a of the viewfinder 2 indicating an aperture value in response to the deflection of the needle, while the other 1b projects past and over fixedly mounted needle support plate 3. Arm 1b is urged to cooperate with the needle arrest plates 4 and the toothed slide 5 in order to adjust the area of aperture opening of the diaphragm device in accordance with the deflection of the needle 1.

Figure 3:
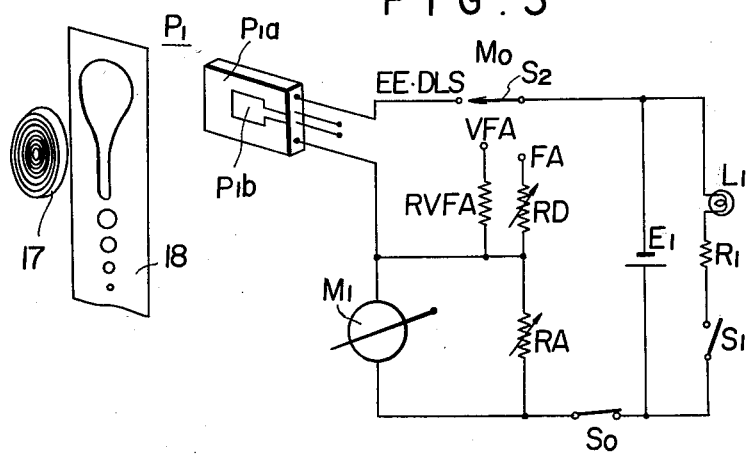
FIG. 3 is a fragmentary partly diagrammatic and partly perspective view of an exposure determining circuit for use in the structure shown in FIG. 2.

The exposure aperture control operation of the automatic exposure control apparatus is as follows. When a shutter button is depressed the release slide 6 is pushed down along an elongated slot engaging a pin against the opposition of a helical spring 6a, the planted pin 6b moves away from the path of one arm 7d of an intermediate lever 7 pivotally mounted on a pin 7b. Level 7 urged, by a helical spring 7a, to rotate in a counterclockwise direction so that the toothed slide 5 is moved to the left in engagement of a pin 7c planted on the other arm of the intermediate lever 7 with a slot 5a. Simultaneously, the needle support plate 4 is moved under action of a helical spring 4a to the left in abutting engagement of a pin 4b with the button edge of the slide 5 until one of the portions 4c, 4d and 4e of the arrest plate 4 arrests the needle 1 at the end portion 1b. When a portion 4d or 4e arrests the needle at the end portion 1b, an insulating pin 4f closes a normally open switch $S_1$ so that, as shown in FIG. 3, a current flows through a lamp $L_1$ to illuminate the area 2b in the viewfinder 2, warning that correct exposure cannot be made. When the release lever 6 is further depressed, one of the teeth 5b of the slide 5 is brought into engagement with the end portion 1b of the needle, thereby the amount of the turning movement of the arm 7d is used to determine the amount of turning movement of a pin 8a on the diaphragm aperture adjusting device 8, so that the area of opening of diaphragm aperture is adjusted in accordance with the deflection of the needle. Simultaneously, the projection 8c of the diaphragm device is turned from the blocking position at a pin 9, and a sliding brush 10 insulatingly mounted on the diaphragm device is positioned on the resistor $R_{FA}$ mounted on the ASA setting ring 11 to select a resistance in accordance with film sensitivity and exposure aperture. For the setting of the film sensitivity, the ASA setting ring 11 is provided with another resistor $R_A$, for movement along which a sliding brush 12 is mounted. When the portion 4e or 4d of the arrest plate 4 arrests the needle 1 at the end portion 1b, the diaphragm aperture is set to the maximum or minimum size of aperture opening respectively.

The above-described operation is valid only when the aperture setting ring 13 is set to the position indicated at EE-DLS in FIG. 2 for automatic normal photographic exposure control, or shutter interval preselection flash exposure control operation. Other functions of the exposure control apparatus described above may be performed by setting the aperture setting ring 13 to the corresponding positions, which will be subsequently described in connection with FIG. 3.

In FIG. 3, a lamp $L_1$ and a resistor $R_1$ for controlling the current flowing through the lamp $L_1$ are connected in series with each other and forms a circuit aong with a battery source $E_1$ such as a mercury cell, and a switch $S_1$. A main switch $S_0$ is arranged to be closed when the winding-up of the film and shutter charge are finished. When the ring 13 is flicked frm one to another of the positions EE-DLS, VFA and FA under action of a click plate spring 14, a resistor transfer switch $S_2$ composed of a brush 15 as a pole and printed patterns 16 as throws is selectively set to the corresponding position. As to the position M, the setting of ring 13 thereto cuts off the meter circuit and does not permit the intermediate lever to engage the pin 8a when the shutter is released, so that the adjustment of the diaphragm device is not affected by the operation of the meter and the toothed slide.

Symbol M in resistor with the index mark provides for manual adjustment of exposure aperture. When the ring 13 is set to a desired aperture value position, the corresponding aperture opening of the diaphragm device 8 is effected by engagement of the projection 13a with the projection 8d. At the same time, the value of resistance $R_{FA}$ is selectively controlled in accordance with the ASA and aperture value in a manner similar to that mentioned in the preceding EE-DLS operation. The provision of the manual diaphragm aperture operable position M not only permits the exposure control apparatus to be manually operated for normal photography but also makes it convenient to carry out flash photography. For example, if the photographer desires to select a faster shutter speed in photographing a moving subject in a dark background scene in flash mode, the aperture opening should be increased to effect correct exposure for the luminance of the background scene as well as that of the moving subject. However, when the necessary aperture opening exceeds the range of the adjustable diaphragm aperture, the exposure control apparatus does not function to derive flash exposure values. In this case, by setting the ring 13 to the position M, the flash exposure control is made possible, although an improper exposure is effected for the luminance of the background scene.

When symbol $V_{FA}$ on the ring 13 is in register with the index mark, the transfer switch is connected to the fixed resistance $R_{VFA}$, so that the needle of the ammeter $M_1$ is deflected in accordance with the variable resistance $R_F$ representing the ASA information to indicate an exposure aperture to which the diaphragm devicer is to be set upon the release of the shutter lever 6, for example, F = 5.6 in response to ASA = 100, F = 8 in response to ASA = 200. By the provision of the position $V_{FA}$, it is made very convenient to use a flash energy variable flash device in combination with the camera without connection for transmission of ASA and aperture value informations therebetween, for it is unnecessary to manually adjust the aperture opening of the diaphragm device of the camera to a value dependent upon the film sensitivity. Of course, the flash device may be a so-called computer stroboscopic unit which is capable of controlling automatically the total flash energy by integration of flash light reflection from the subject.

The symbol FA in register with the index mark provides for the so-called "flash auto" photography using, in combination, a flash energy invariable flash device and the camera incorporating the system of the invention. When the ring 13 is set to this position, the transfer switch $S_2$ is connected to a variable resistor $R_D$ of which the resistance value is controlled in interlocking relationship with the distance adjusting ring not shown in FIG. 2, so that the needle of the ammeter $M_1$ is deflected in accordance with the ASA sensitivity and the distance, or resistances $R_A$ and $R_D$ to adjust the aperture opening to an appropriate value for automatic flash photography. The resistor $R_D$ may be set to a value dependent upon not only the distance but also the guide number of the flash device.

When the symbol EE-DLS is aligned with the index mark in order to carry out an automatic normal exposure control photography, or shutter speed preselection flash exposure control photography, the transfer switch $S_2$ is set to the position indicated in the figure to connect the portion $P_{1a}$ of the photoresponsive element $P_1$ to the ammeter $M_1$. The light from the objects is focused by a condenser lens 17 on the outer portion $P_{1a}$ as well as central portion $P_{1b}$ of the photoresponsive element $P_1$, the light impinging on the central portion $P_{1b}$ corresponding to the light from the subject of principal interest, while the light impinging on the outer portion $P_{1a}$ corresponding to the light from the environment. A diaphragm means 18 in the form of a diaphragm plate is located in front of the photoresponsive element, its aperture opening being controlled in accordance with the selected shutter speed so that the energy of light impinging on the portion $P_{1a}$ depends upon the luminance of the environment and the shutter interval, and the needle 1 is deflected indicating an exposure aperture which when factored into an exposure value provides correct exposure for the luminance of the environment. The portions $P_{1a}$ and $P_{1b}$ may be provided on the same substrate as an element, but may be made as independent elements and arranged in the same plane. The terminals of the central portion $P_{1b}$ are connected to the flash energy control circuit of the flash device. The lamp $L_1$ illuminates when the total flash energy thus derived does not fall within the selectable range.

Figure 4:
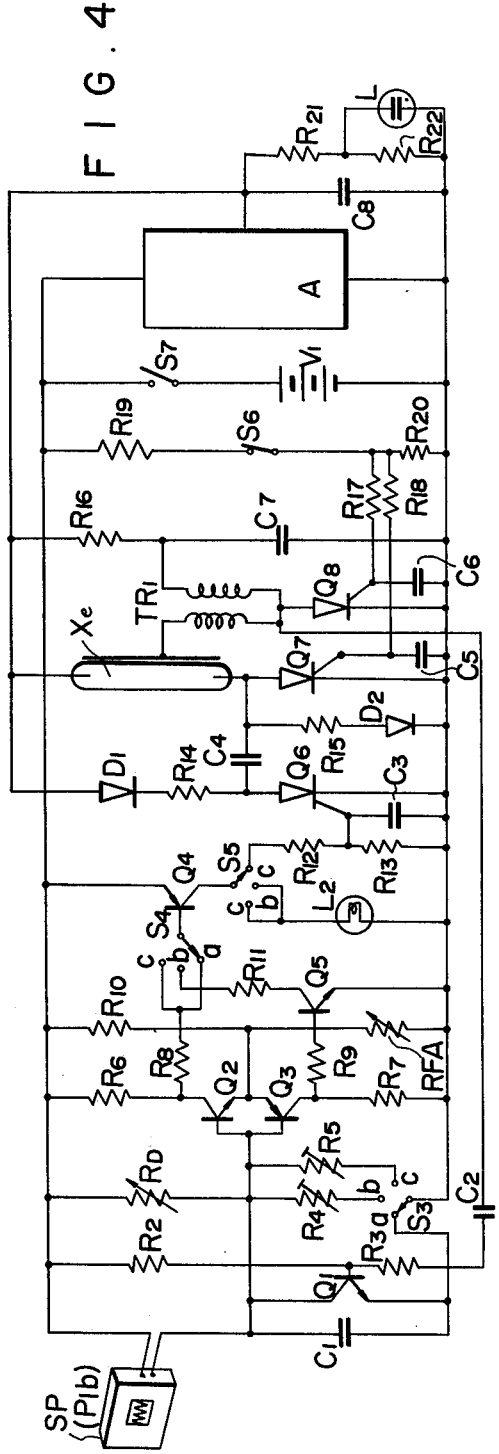
Figure 6:
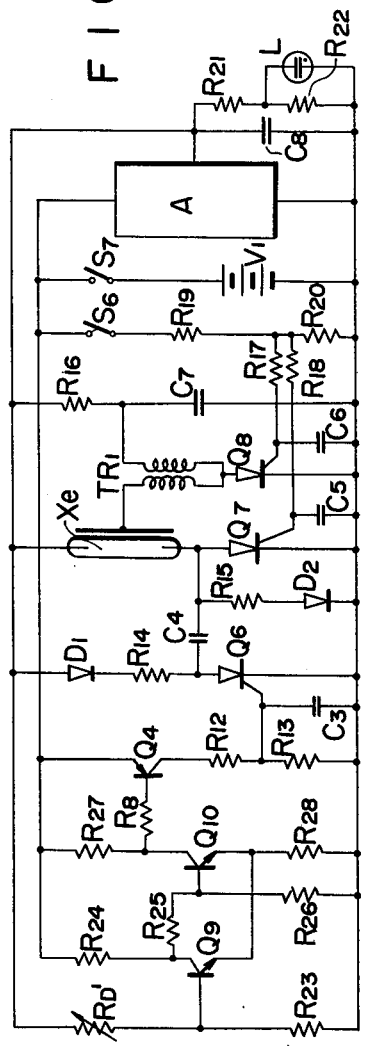

FIGS. 4, 5 and 6 illustrate example of the practical circuit of the flash device which is used in combination with the apparatus shown in FIGS. 2 and 3.

The feature of the circuit shown in FIG. 4 resides in that the flash condenser $C_3$ of which the charging voltage is maintained constant by a booster circuit A, a photoresponsive element for spot photometry, for example, a cadmium sulfide photocell for measuring the luminance of the subject, a variable resistor $R_D$ of which the resistance value is controlled in accordance with the camera-to-subject distance in interlocking relationship with the distance adjusting ring of the camera, and a variable resistor $R_{FA}$ of which the resistance value is controlled in accordance with the film sensitivity and exposure aperture of the camera, are arranged to perform the function of deriving a flash energy control parameter which may be factored into a flash exposure value dependent upon the luminance of the subject, camera-to-subject distance, diaphragm aperture and film sensitivity. In order that the system of the invention is capable of recognizing that the given complex lighting situation is severe for the evaluating performance of the system, for example, when photographing a subject at a relatively long distance, or a subject situated at a relatively short distance and having a luminance almost equal to that of the environment, the apparatus described above is further provided with warning lamps for warning that an over-exposure or under-exposure would result for the luminance of the subject and a check button for performing the checking operation.

Consideration will be next given to the operation of the circuit. Before the energization of the flash tube, a condenser $C_1$ is short-circuited by a transistor $Q_1$ which is driven to be conducting by a resistor $R_3$. Upon actuation of the synchronous contact $S_6$ of the camera, SCR $Q_8$ and $Q_7$ are driven to be conducting through resistors $R_{17}$ and $R_{18}$, so that the charge on the trigger condenser $C_7$ is delivered to the trigger coil $TL_1$ to activate the flash tube Xe for firing. At the same time, the potential of the anode of SCR $Q_8$ is lowered to ground potential, and the drop of the potential cuts off the transistor $Q_1$. After the energization of the stroboscopic discharge tube Xe, the condenser $C_1$ is charged through the variable resistor $R_D$, the resistance of which is varied in accordance with the subject distance and the photoresponsive element for measuring the luminance of the subject. When the voltage $V_c$ of the condenser has reached the voltage $V_o$ ($V_o + V_{SE2}$) established at the connection between the resistors $R_{FA}$ and $R_{10}$, transistors $Q_2$ and $Q_4$ are turned on. When the transistor $Q_4$ is on, a voltage established at the connection between the resistors $R_{12}$ and $R_{13}$ is applied to the gate of SCR $Q_6$, so that SCR $Q_6$ is conducting. A negative potential is applied to the anode of the SCR $Q_7$ through a condenser $C_4$ to drive SCR $Q_7$ to be non-conducting, thereby the current flowing through the stroboscopic discharge tube is cut off to terminate the energization of the tube. There are provided condensers $C_3$, $C_4$ and $C_5$ for avoiding misoperation, a diode D for preventing the voltage at which the condenser $C_1$ is charged from decreasing as the discharge of the flash tube precedes, a diode $D_2$ for preventing a current from flowing through a resistor $R_{15}$ when SCR $Q_6$ is on and a negative potential is applied through the condenser $C_4$ to SCR $Q_7$, and resistors $R_{21}$ and $R_{22}$ for energization of a neon lamp L at the time when the voltage at which the main condenser is charged through the constant voltage booster has reached a predetermined level. In order to check whether the necessary flash energy is available for the exposure value as determined from film sensitivity, aperture, distance and luminance informations, the apparatus of the invention is further provided with a transfer switch means comprising three transfer switch elements $S_3$, $S_4$ and $S_5$ commonly interconnected which is normally set to the position indicated at a. When the transfer switch means is set from the position a to the position b or c, a voltage Va established at the connection between the compound resistor of the photoresponsive element of which the resistance value is controlled in accordance with the luminance of the subject and a variable resistor $R_D$ of which resistance value is controlled in accordance with the subject is distance, and a variable resistor $R_3$ for checking the over-exposure, or a variable resistor $R_4$ for checking under-exposure is compared with a voltage Vo established at the connection between the variable resistor $R_{FA}$ and resistor $R_{10}$. In the case of over-exposure, or under-exposure, the warning lamp illuminates.

In practice, a check button, not shown, is depressed to transfer the pole from the throw a to the throw b, the voltage $V_A$ established at the connection between a combined resistance of the photoresponsive element CdS·SP and the distance setting resistor $R_D$, and the resistor $R_4$ is applied to the base electrodes of the transistors $Q_2$ and $Q_3$. The resistance value of the resistor $R_4$ is adjusted to such a value that if the subject luminance and the subject distance are acceptable for an exposure value in conformance with preselected film sensitivity and exposure aperture, then $V_o < V_A$. Therefore, inasmuch as complex lighting situations encountered are photographable, all of the transistors $Q_3$, $Q_4$ and $Q_5$ are off, so that the warning lamp $L_2$ is off. If the subject distance is unacceptable, then $V_A < V_o$, so that the transistors $Q_3$, $Q_4$ and $Q_5$ are on, then the lamp $L_2$ is on. When the lamp $L_2$ is on, it is necessary to increase the aperture opening, or decrease the subject distance by approaching to the subject as close as the lamp $L_2$ is off. When the check button is further depressed to transfer the pole from the throw b to the throw c, the voltage $V_B$ established at the connection between the combined resistance of the photoresponsive element and distance setting resistor $R_D$, and the resistor $R_5$ is compared with the voltage Vo to check whether an over-exposure results. The resistance value of the resistor $R_5$ is adjusted to such a value that if the subject luminance and the subject distance are acceptable for an exposure value in conformance with the preselected film sensitivity and exposure aperture, then $V_B > V_o$. Therefore, when the given complex lighting situation is photographable, the transistors $Q_2$ and $Q_4$ are off, so that the warning lamp $L_2$ is off. However, if the exposure aperture is too large, or the subject distance is too short to set the apparatus thereto, then $V_B > V_o$, so that transistors $Q_2$ and $Q_3$ are on, and then the lamp $L_2$ is on. When the lamp $L_2$ is on, it is necessary to reduce the aperture opening, or increase the subject distance by departing away from the subject as far as the lamp $L_2$ is off.

FIG. 5 illustrates another example of the flash energy control circuit having the same function as that of the circuit shown in FIG. 4. The circuit shown in FIG. 5 is different from that shown in FIG. 4 in the following two points, (1) the mode of the connection of the swtich $S_4$ which is transferred in interlocking relationship with the check button, and (2) the employment of parallel connection of stroboscopic discharge tube with a by-pass discharge tube in controlling the flash energy instead of the series connection thereof.

FIG. 6 illustrates still another embodiment of the flash energy control circuit wherein the energization of the discharge tube is terminated when the detected voltage of the main condenser has reached a predetermined level, as has been already proposed by the present patent applicant in Japanese Patent Application No. Sho 44-92309 titled "automatic exposure control system for speed light unit". In the figure, A is a constant voltage booster circuit for charging the main condenser $C_3$ at a high constant voltage. Resistors $R_{24}$, $R_{25}$, $R_{26}$, $R_{27}$ and $R_{28}$ and transistors $Q_8$ and $Q_{10}$ constitute a schmidt circuit. A variable resistor $R_D$, is set to a value dependent on the subject distance, film sensitivity and exposure aperture informations. In FIG. 6, we have used the same reference numerals as used in FIGS. 4 and 5 to describe similar parts.

The operation of the circuit is as follows. When the front shutter plane of the camera is opened to turn on the synchronous switch $S_6$, SCR $Q_8$ is driven to be conducting, thereby the flash tube is triggered through the trigger coil $TL_1$ in the same manner as that shown in FIGS. 4 and 5. As the integrated energy of flash light emitted from the flash tube increases, the voltage of the charge stored on the main capacitor $C_3$ decreases. Since the variation of the voltage established at the connection between the variable resistor $R_D$ and resistor $R_{23}$ is proportional to the variation of the voltage across the main capacitor, when the divided voltage has reached the trigger level of the schmidt circuit, that is, when the integrated energy of the flash light has reached the predetermined level, SCR $Q_6$ is driven to operate to terminate the energization of the flash tube, thus the circuit described above performing the same function as that described in connection with FIGS. 4 and 5.

According to the embodiment described with reference to FIGS. 2, 3, 4, 5 and 6, the following photographic results are effected. In an ambient natural light illumination photography application using no flash device, an accuracy of exposure control as high as that effected by the prior art automatic exposure control apparatus can be secured. On the other hand, in a complex light illumination photography application using a flash device, flash exposure values appropriate for both the luminance of the subject of principal photographic interest and the luminance of the environment of the subject can be derived with high accuracy provided that both of the diaphragm aperture regulating device and the flash energy control device are settable in conformance with the preselected shutter interval, which is detected by means of the ammeter or warning lamp. In case only the flash energy control device is settable which is detected by the lamp $L_2$ without illumination, the diaphragm aperture regulating device is set to either of the extreme selectable positions on the desired side, so that flash exposure values appropriate for the luminance of the subject alone are derived with high accuracy, while in case only the diaphragm aperture regulating device is settable, the flash energy control device is set to either of the extreme selectable positions on the desired side, so that flash exposure values appropriate for the luminance of the environment alone are derived with high accuracy. Reading the exposure control parameter informations indicated in the viewfinder, the photographer may select his desired aperture value and shutter speed and insert their settings into the respective devices. In this case, although the accuracy of exposure control is somewhat lowered, it is possible to derive satisfactory exposure values for both of the luminances of the subject and its environment. In case the both devices are unsettable, each of them is set to either of the extreme selectable positions on the desired side. A release stop means which operates when the diaphragm aperture regulating, device is unsettable may be provided in the system of the invention. However, this means can be easily embodied based on the known art, so that its illustration is omitted.

However, the drawback of the embodiment described heretofore is that the intensity of the abient natural illumination is detected by the outer portion $P_{1a}$ of the photoresponsive element but not the central portion $P_{1b}$ thereof, so that the luminance of the subject of principal interest which is usually positioned at the central part of the frame of film is not taken into account. The drawback is serius especially when the subject is photographed under counterlighting conditions.

In order to remove the drawback, the connection of the photoresponsive element $P_1$ to the exposure control circuit is modified as shown in FIGS. 7 and 8. In FIG. 7, reference numeral 19 indicates a counter-lighting condition setting button which is accessible at the exterior of the panel 21 of the camera and which is normally urged by a helical spring 20 to move upwards, so that the pole of the transfer switch $S_8$ is normally connected with the throw $A_V$ to connect the outer portion $P_{1a}$ to the exposure control circuit 22 as shown in FIG. 3. In a counter-lighting photography application, when the luminance of the subject is darker than that of the environment by several stops of aperture setting, the button 19 may be depressed to set the transfer switch $S_8$ to the position $S_p$, so that the central port $P_{1b}$ is connected to the circuit 22, thereby an ambient natural illumination exposure values appropriate for the luminance of the subject are derived. The portion $P_{1b}$ is always connected to the flash energy control circuit of the flash device.

In FIG. 8, when a transfer switch $S_9$ is set to the position DLS to connect the portion $P_{1a}$ to the circuit 22, an aperture control signal is derived to effect correct exposure for the luminance of the environment, while when the transfer switch $S_9$ is set to another position EE, the portions $P_{1a}$ and $P_{1b}$ are connected in series with each other, thereby the circuit 22 is made responsive to the both photometric outputs to derive flash exposure values which are favorable for that portion of the objects being photographed which has a lower luminance than the other object. For example, when objects are photographed under counter-lighting conditions, a very preferable result is effected for the exposure of the central portion of the photographic film frame. Also the flash energy control circuit is connected to the portion $P_{1b}$. The transfer switch $S_9$ may be interlocked with the aperture setting ring 13 shown in FIG. 2. In this case, the construction of the ring 13 must be modified as providing two setting positions EE and DLS.

In FIG. 10, a photoresponsive element $P_2$ is constructed as comprising two segments $P_{2a}$ and $P_{2b}$ arranged to be separated from each other, the segment $P_{2b}$ corresponding to the outer portion $P_{1v}$, while the segment $P_{2a}$ corresponding to the central portion $P_{1a}$. But the segment $P_{2a}$ differs from the portion $P_{1a}$ in that the photometry is made over the entire view field range including the area corresponding to the central portion $P_{1a}$. Therefore, in the flash photography application under daylight counter-lighting conditions, the area of the aperture opening is adjusted to a slightly larger value than that which would otherwise be determined by the use of the element $P_1$, thereby providing the consistent exposure, so that a slight overexposure for the luminance of the environment is effected, but the degree of the overexposure is so small as to be negligible in practice.

Another embodiment of the present invention will be described herebelow with reference to FIGS. 11, 12 and 13. Whilst the former embodiment is constructed as using a shutter mechanism of the mechanically time interval control type, the latter embodiment is characterized by the use of a shutter mechanism of the electrically time interval control type, that is, an electrically timed shutter. The electrically timed shutter which is usuable in the invention is not of the common type but of the so-called magic shutter type in which when the preselected shutter speed is inappropriate, that is, when the exposure aperture determined to conformance with the preselected shutter speed does not fall within the adjustable range of the diaphragm device, the diaphragm device is set to that limit of the adjustable range which is near the desired aperture value, and in turn the shutter speed setting is automatically transferred to a different shutter speed setting. Besides the above operating form, the electrically timed shutter can be used in the aperture preselection exposure controls form.

Figure 11:
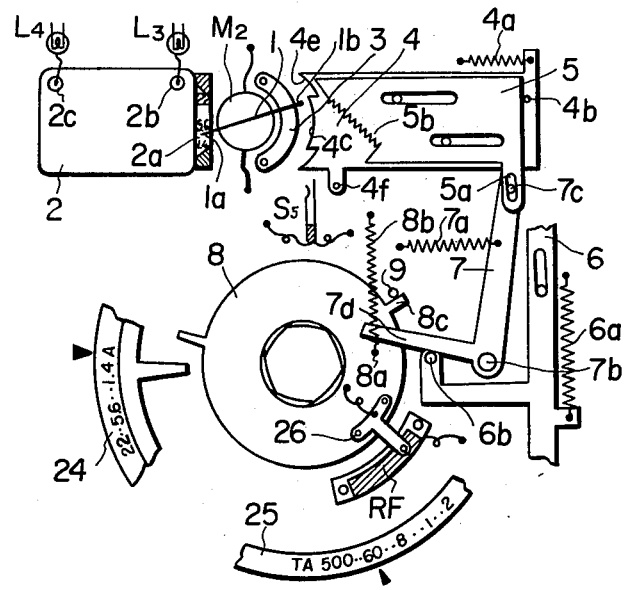
FIG. 11 is a fragmentary front elevational view, partly broken away, of another example of the camera structure shown in FIG. 2 with a modification.

In the disclosure of FIG. 11, we have used the same reference numerals as used in FIG. 2 to describe similar parts. An aperture setting ring 24 corresponding to the ring 13 of FIG. 2, or the ring 23 of the FIG. 9, is illustrated as having a symbol mark A (corresponding to EE-DLS) and aperture scale for manual operation. When a shutter speed setting ring 25 is set to the position in the figure, the shutter speed preselection exposure control is effected. When the symbol mark TA is aligned with the index mark, the aperture value preselection shutter speed control is effected. The diaphragm aperture regulating means 8 is provided with a brush 26 insulatingly mounted thereon which is slidable on the resistor $R_F$ to provide the resistance value representative of the exposure aperture information. A switch $S_{10}$, lamps $L_3$ and $L_4$ and ammeter $M_2$ correspond respectively to those indicated at $S_1$, $L_1$, $L_2$ and $M_1$ in FIG. 2. The operation of the apparatus shown in FIG. 11 is to be subsequently described in connection with the operation of the circuit shown in FIG. 12.

Figure 12:
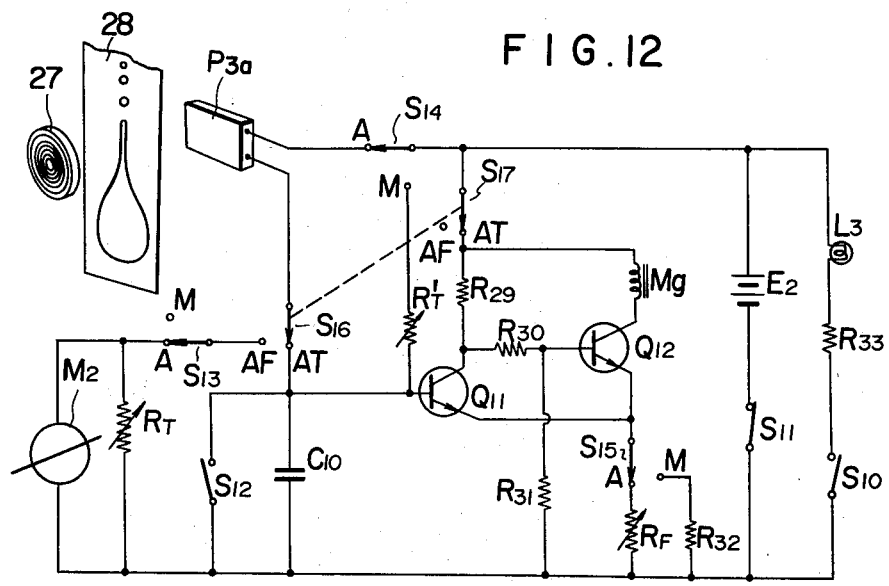
FIG. 12 is a fragmentary partly diagrammatic and partly perspective view of an exposure determining circuit adapted for use in the camera structure shown in FIG. 11.

In FIG. 12, reference numerals 27 and 28 indicate respectively a condenser lens and a diaphragm aperture regulating means of the plate form of which the aperture opening is adjusted in accordance with the sensitivity of photographic film. The circuit is illustrated as including a photoresponsive element $P_{3a}$ for photometry of average luminance, a resistor $R_{33}$ corresponding to the resistor $R_1$ of FIG. 3, a battery source $E_2$, a main switch $S_{11}$, a starter switch $S_{12}$ of the time constant circuit of the electrically timed shutter which is turned off when the shutter is opened, three transfer switches $S_{13}$, $S_{14}$ and $S_{15}$, the switch $S_{13}$ being set to the position A only when the symbol on the aperture setting ring of the FIG. 11 is aligned with the index mark, or otherwise being set to the position M, the switch $S_{14}$ being set to the position M only when the shutter speed setting ring 25 is set to the position indicated in the figure and simultaneously the other ring 24 is set to the manually operable position, and the switch $S_{15}$ being set to the position M only when the ring 24 is set to the manual setting position and simultaneously the ring 25 is set to the position indicated in the figure, and a transfer switch means including two transfer switch elements $S_{16}$ and $S_{17}$ which are commonly interconnected for conjoint operation from one position to the other and which are interlocked with the release lever in such a manner that the shutter release to the first step causes the switch means to be set to the position AF, and, in the second step, to the position AT.

Consideration will be now given to the operation of the circuit. Firstly in the shutter speed preselection exposure control system application, the aperture setting ring 24 and shutter speed setting ring 25 are set to the positions as indicated in FIG. 11, thereby each of the transfer switches $S_{13}$, $S_{14}$ and $S_{15}$ being set to the position A. The switch means $S_{16}$ and $S_{17}$ is set to the position AT before shutter release, so that the needle of the ammeter $M_2$ is deflected in response to the exposure aperture determined in conformance with the exposure value for the luminance of the environment which is derived in accordance with the resistance value of the variable resistor $R_T$ interlocking with the ring 25, and the ASA sensitivity as well as the resistance value of the photoresponsive element $P_{3a}$. In the middle of the shutter release, the aperture opening of the diaphragm device is adjusted in response to the deflection of the needle in the same manner as that shown in FIG. 2, thereupon the resistance value of the variable resistor $R_F$ is automatically controlled. After the aperture adjustment is completed, a further progression of the shutter release to the second step causes the switch means $S_{16}$ and $S_{17}$ to be set to the position AT, so that the ammeter circuit is cut off and instead the time constant circuit is connected. Finally, when the shutter is opened, the starter switch $S_{12}$ is opened in synchronization therewith to start the charging of the timing condenser $C_{15}$. In a period of time, the schmidt circuit comprising resistors $R_{29}$, $R_{30}$ and $R_{31}$ and transistors $Q_{11}$ and $Q_{12}$ of which the trigger level is established by the resistor $R_F$ of which the resistance value is controlled in accordance with the exposure aperture is driven to operate, thereupon the magnet Mg is energized to close the shutter. The exposure interval of time thus produced depends upon the luminance, the ASA sensitivity and the exposure aperture determined to conformance with the preselected shutter speed, so that correct exposure is effect for the luminance of the environment. In this case, when a flash device to be described later in connection with FIG. 13, of which the flash energy is controlled in accordance with the aperture and distance is used, correct exposure is effected for the luminance of the subject as well.

When the position of the shutter speed setting ring 25 is unsuited for the given photographic situation, the unsuitability is detected by means of an ammeter $M_2$ or lamp $L_3$ before exposure. But if the shutter is released regardless of the unsuitability, the operation of the system precedes as follows. When the computed aperture value does not fall within the adjustable range, the diaphragm device is set to either of the selectable extreme positions on the desired side in the same manner as that shown in FIG. 2. In response to the adjustment of the diaphragm aperture of the limit value, the resistance of the resistor $R_F$ incorporated in the time constant circuit as a circuit parameter is varied. The exposure interval determined by the time constant circuit is different from that preselected by the shutter speed setting ring 25. The exposure interval thus determined provides correct exposure only for the luminance of the environment as an usual shutter speed preselection exposure control does. In this exposure, if the flash device is used, the above exposure interval provides correct exposure for the luminance of the subject as well as that of the environment.

The apparatus of the invention may be used in the aperture preselection form. In this case, the aperture setting ring 24 is set to a desired predetermined aperture value, and the shutter speed setting ring 25 is set to the position TA, thereby the switch $S_{13}$ is set to the position M to make the ammeter $M_2$ inoperative, and the setting of the switches $S_{14}$ and $S_{15}$ to the positions A remains unchanged. The area of the aperture opening is adjusted to the predetermined value in the same manner as that shown in FIG. 2, and the operation of the time constant circuit of the electrically time shutter also is the same as that of the system of the shutter speed preselection form. With the system of the form described, both of normal photography and flash photography can be carried out correctly.

Further the apparatus of the invention may be used for the manual operation with respect to both of the shutter speed and aperture value settings. In this case, both of the rings 24 and 25 may be manually set to desired predetermined positions, thereupon each of the transfer switches $S_{13}$, $S_{14}$ and $S_{15}$ is set to the position M. While the aperture opening is adjusted in the same manner as that described above, the exposure interval is adjusted as follows. When the switch $S_{14}$ is set to the position M, the photoresponsive element $P_{3a}$ is disconnected from the circuit and instead a manually selectable exposure interval control resistor $R_T'$ is connected to the circuit. The simultaneous transfer of the pole of the switch $S_{15}$ to the throw M causes the resistor $R_T$ of which resistance value is adjusted in accordance with exposure aperture to be disconnected from the circuit and instead the fixed resistor $R_{32}$ to be connected. As a result, the time interval of the time constant circuit depends on only the resistance $R_T'$. During the time interval thus produced, the electrically timed shutter operates.

In the above-described embodiments, the accuracy of exposure control can be improved by the employment of a photoresponsive element having so rapid responsibility that the system is responsive to the flash light reflection from the environmental objects. When photographing the subject situated adjacent to a light-reflective large wall, therefore, an overexposure due to the flash light reflection can be prevented.

Figure 13:
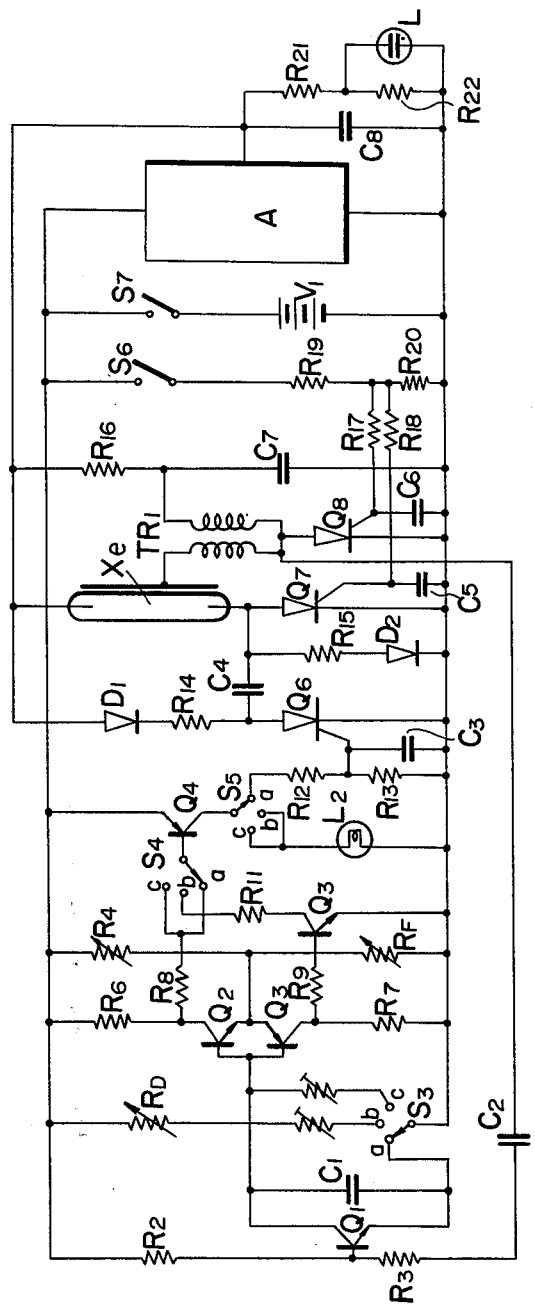
FIG. 13 is a diagram of the flash energy control circuit of the stroboscopic unit for use in the present invention.

FIG. 13 illustrates another example of the flash energy control circuit having the same function as that shown in FIG. 4, but differing in the two points (1) the inresponsibility of the subject luminance information, and (2) the independent settings of film sensitivity and exposure aperture informations, the film sensitivity setting being manually inserted, while the aperture setting of which value is determined to conformance with the preselected shutter speed being automatically inserted. The same reference numeral as used in FIG. 4 are used to describe similar parts.

Figure 14:
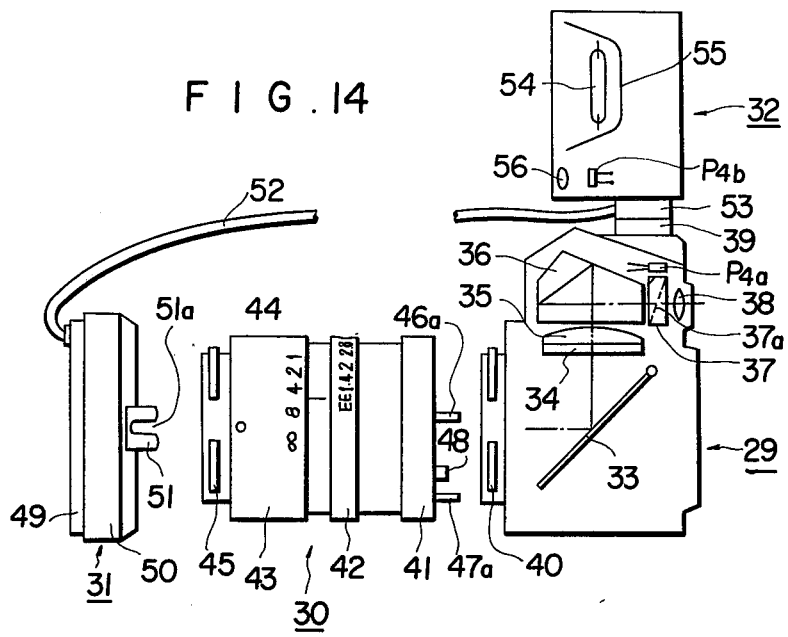
FIG. 14 is a side elevational view, partly broken way, of a combination of a single reflex camera and a flash device constituting the exposure control system of the present invention.

The control system of the invention as desclosed heretofore is applicable to a single lens reflex camera. One example of the exposure control system adapted for a single lens reflex camera having an automatic diaphragm aperture regulating device will be desclosed herebelow. In FIG. 14, a camera body 29, a replaceable objective 30 equipped with an automatic diaphragm aperture regulating device, an adaptor 31 for detecting the distance information in response to the focus adjustment of the objective and a flash device 32 arranged as a separate unit from the camera body 29 constitute an exposure interval preselection exposure control apparatus for flash photography under daylight illumination.

The camera body 29 has incorporated therein a pivotable mirror 33, a pint glass 34, a condenser lens 35, a dach prism 36, a prism 37 having a half-mirror incorporated therein which reflects part of the light in the viewfinder to a photoresponsive element $P_{4a}$, and an eyepiece 38. On the top of the camera housing, there is provided an otoshoe 39 for engagement with the flash device. The camera housing has bayonet pawls 40 at the front panel. The camera body is further provided with an ammeter and toothed slide not shown incorporated therein to control an exposure aperture in accordance with the luminance by which the diaphragm aperture regulating device of the objective is controlled.

The replaceable objective 30 is provided with an engaging ring 41 which when engaged with the bayonet pawls 40 mounts the objective to the camera body, an aperture setting ring 42, a distance adjusting ring 43 having a pin 44 planted thereon, bayonet pawls 45 for engagement with the adaptor 31, a projection 46a of an intermediate ring for transmission of aperture information between the camera body and the objective, a projection 47a of automatic diaphragm aperture adjusting ring, and a compensation ring 48 for compensating the deviation of the exposure control parameter effected by the replacement of the objective.

An adaptor 31 of the type as proposed in Japanese patent application No. Sho 45–86939 of the present patent applicant which is adapted to be mounted on the tip of the objective in order to detect the distance information from the objective, comprises a fixing ring 49 for use in mounting the adaptor 31 to the objective in engagement with the bayonet pawls 45, a turnable ring 50 having a lug 51 which is engageable with the pin 44 of the distance adjusting ring 43 to turn the ring 50 in response to the turning movement of the ring 43. The ring 49 is blocked against turning movement so that the angular orientation of the rings 49 and 50 with reference to each other is varied in accordance with the subject distance to vary the position of a slide blush not shown on the slide resistor not shown. The distance information is led to the flash device through a cord 52 terminating in a plug 53 to be inserted to the jack 53 of the flash device.

The flash device 32 is provided with a foot for engagement with the otoshoe 39, a jack to which the plug 53 is to inserted, a discharge tube 54, a reflector 55, a condenser lens 56 and a photoresponsive element $P_{4b}$. The condenser lens 56 and photoresponsive element $P_{4b}$ are arranged to receive the light from that portion of scene which is to be photographed at the center of the film frame. From the point of view of reducing the cost of the camera, as suggested in the figure, it is preferred to incorporate in the flash device the photoresponsive element $P_{4b}$ for photometry of the central portion, because in normal photography using no flash device, there is no need to use the fragmentary element $P_{4b}$ but only the fragmentary element $P_{4a}$ incorporated in the camera for photometry of the average luminance of the entire view field range.

Figure 15:
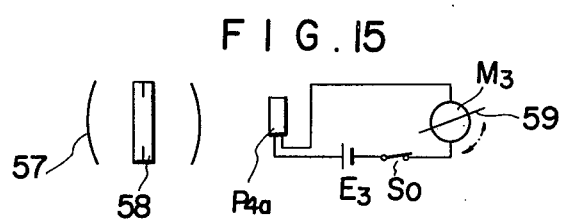
FIG. 15 is a diagram of the exposure determining circuit for use in the camera shown in FIG. 14.
Figure 16:
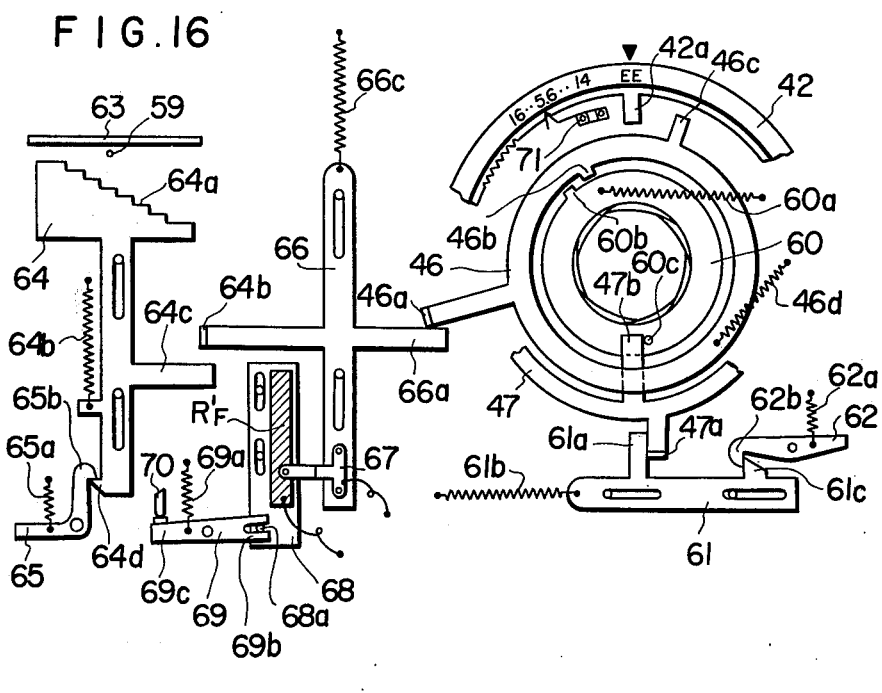
FIG. 16 is a fragmentary exploded front elevational view of another embodiment of the camera structure shown in FIG. 3 with a modification.

FIG. 15 illustrates an ammeter circuit incorporated in the camera. The light from the subject being photographed passes through the lens 57 of the replaceable object 30 and the automatic diaphragm device 58, impinging the photoresponsive element $P_{4a}$ connected to a battery source $E_2$ and ammeter $M_3$, so that the intensity of current flowing through the ammeter $M_3$ depends upon the subject luminance and the maximum lens aperture. The casing of the ammeter $M_3$ is turntable to select the ASA sensitivity and shutter speed, so that the resultant position of the needle 59 depends upon the selected ASA sensitivity and shutter speed.

FIG. 6 illustrates the linking relationship between the automatic diaphragm device of the objective and the diaphragm aperture control device of the camera. An intermediate ring 46 having projections 46a, 46b and 46c is arranged to be engageable with an aperture setting ring 60 and a slide 61. The ring 60 having a projection 60b and a pin 60c is urged by a helical spring 60a to turn in a clockwise direction, but is normally locked through a pin 60c, a connector 47 and the slide 61 to a lever 62. The slide 61 is urged by a helical spring 62a to move to the left but is locked by engagement of the lug 61c with a pawl 62b of the locking lever 62 urged by a helical spring 62a to pivot in a counterclockwise direction, so that the aperture setting ring 60 is in the blocking position indicated in the figure. A fixedly mounted needle supporting plate 63 is positioned over the needle 59. A slide 64 having a toothed portion 61a is urged by a strong helical spring 64 to move upwards. The slide 64 has a projection 64c which is engageable with the arm 66b to move the slide 66 upwards, and a pawls 64d which is locked with a pawl 65b of a lock lever 65 urged by a helical spring 65a. The intermediate slide 66 having arms 66a and 66b is urged by a weak helical spring 66c to move upwards. When the projection 64c is brought into engagement with the arm 66b to move the intermediate slide 66 upwards, the other arm 66a normally engaging with the projection 46 turns the ring 46. A sliding brush 67 insulatingly mounted on the slide 66 is positioned on the resistor $R_F$ mounted on a sliding plate 68. A pin 68 planted on the slide 68 engages the recessed portion 69b of a lever 69, the opposite end of the lever 69 being abutted to a member 70 which is engageable with the compensation pin 48 shown in FIG. 14 to vary the resistance $R_F$ in accordance with the deviation effected by the replacement of the objective. An aperture setting ring 42 has a projection 42a and is flicked under action of a click spring 71.

Consideration will now be given to the operation of the mechanism described above. When the ring 42 is set to the position EE, the needle 59 is deflected in accordance with the subject luminace, shutter speed and ASA sensitivity. When the shutter release lever is depressed in the first step to turn the lock lever 65 in a counterclockwise direction, the toothed slide 64 moves upwards so that the needle 59 is arrested between the supporting plate 63 and a tooth of the toothed portion 64. The amount of movement of the alide 64 determines the amount of turning movement of the intermediate ring 46 in a clockwise direction. A further depression of the shutter release lever causes the lock lever to turn in a clockwise direction at an appropriate instant before the opening of the shutter, so that the slide 61 moves to the left, thereby the ring 47 being turned together with the ring 60 in clockwise direction under action of the spring 60a until the lug 60b of the ring 60 strikes the lug 46b of the intermediate ring 46, because the force of the spring 60a is weaker than that of the spring 46d. Thus the aperture opening is adjusted to conformance with an exposure value before the shutter starts to open. In flash photography application, while the aperture opening is adjusted to the same manner as above, an exposure aperture output signal is extracted from the resistance of the resistor $R_F$ and then introduced to the flash energy control circuit of the flash device to control the total flash energy, so that corect exposure is effected for the luminance of the subject. For the manually operable aperture control, the ring 42 is set to a desired aperture value position, thereby the ring 46 is turned by engagement of the projection 42a with the projection 46c to the corresponding position, so that the aperture opening is adjusted to the predetermined value before the shutter starts to open.

In the foregoing description of the embodiments, we have omitted the description as to the charge device for resetting the apparatus before exposure, and its operation. While the invention has been illustrated and described as embodied in exposure control apparatus for daylight flash photography, it is not intended to be limited to the details shown, since various modification and structural changes may be made. For example, the aperture adjustment may be made by using a time constant circuit or balancing circuit. Further, when the apparatus is used for night flash photography, photographic results as soon as or better than that effected by the use of prior art flash-auto system are obtained.

Figure 17:
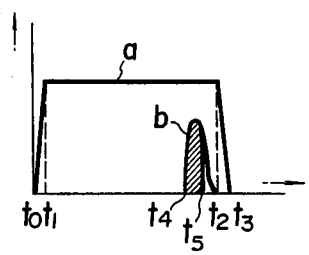
FIG. 17 shows curves illustrating certain operating principles of the flash exposure control system according to the present invention.

FIGS. 17–123 illustrate operating principles and constructions of further embodiments of the present invention. FIG. 17 illustrates a relationship between the lens shutter operating period and flash lighting period with respect to the delay of actuation. When the shutter button is depressed at time $t_0$, the shutter starts to open rapidly, reaching the full open position in a very short period of time $t_1$. After a manually selected time interval or a predetermined time interval selected by the automatic exposure control apparatus, the shutter starts to close at time $t_2$, reaching the closed position in a very short period at time $t_3$. On the other hand, the flash tube is triggered not at time $t_1$ as is usual in prior art systems, but at time $t_2$ in about 1 ms. (millisecond) before the time $t_2$ by means of a flash triggering means to be described later. When the sum of natural light reflection integrated between $t_0$ and $t_5$ and flash light reflection between $t_4$ and $t_5$ has reached the predetermined level at time $t_5$, the energization of the flash tube is terminated. Thus, by taking into account the influence of natural ambient illumination, correct exposure is effected with high accuracy.

Figure 18:
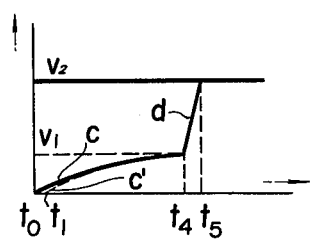
FIG. 18 is a curve illustrating the charging rate of the time constant circuit.

FIG. 18 illustrate the variation of voltage across the condenser or RC circuit portion of the flash energy control circuit with time. Between times $t_0$ and $t_4$, the subject is illuminated by ambient natural light alone, so that the voltage across the condenser increases gradually along the curve $c$, reaching a level $V_1$ at $t_4$. When the flash tube is triggered at $t_4$, the subject is illuminated by complex light composed of the ambient natural light and the flash light, so that the voltage across the condenser increases rapidly as shown by curve $d$, reaching the predetermined level $V_2$ in a certain period of time, thereupon the energization of the flash tube is terminated. Because of a very short period of time between $t_0$ and $t_1$ (as well as between $t_2$ and $t_3$), the instant at which the charging of the condenser starts may be taken not at $t_0$ but at $t_1$, while maintaining sufficient accuracy of exposure control. In this case, the voltage across the condenser increases as shown by curve c'.

As stated in connection with FIGS. 17 and 18, the time intervals between $t_0$ and $t_1$ and between $t_2$ and $t_3$ are so small as to be negligible in practice, and the time interval between $t_4$ and $t_2$ is in the order of 1 ms. However, after the termination of energization of the flash tube, the shutter is open yet, so that the photograhic film is exposed to the natural ambient illumination of the subject in an additional short period of time. The additional exposure also is so small to be negligible, but if the compensation for the slight overexposure is desired to be performed, the energy control circuit may be disigned so as to have the trigger level $V_2$ slightly lower than that of providing correct exposure, or to coincide $t_5$ with $t_2$ as in the case of the embodiment to be described later. Also it is possible to design the exposure control system in such a manner that the flash tube is triggered at the instant at which the shutter starts to close, and after the termination of energization of the flash tube, the closure of the shutter is completed with a slight delay from the predetermind instant of the termination. Further, in the flash device, a time interval between the initiation and termination of energization of the flash tube should be determined not only by the flash discharging characteristic, the subject distance and the intensity of ambient natural illumination, but also by taking into account the sensitivity (ASA) of film and the lens aperture (F). Therefore, for simplicity of the apparatus, the operation of the apparatus may be modified in such a way that the manual selection of the aperture value of the photographic lens is related to the selected ASA sensitivity, for example, F = 5.6 in response to ASA = 100, F = 8 in response to ASA = 200 and so forth, thereby the necessity of inserting the ASA and F settings into the flash energy control circuit is removed.

Figure 19:
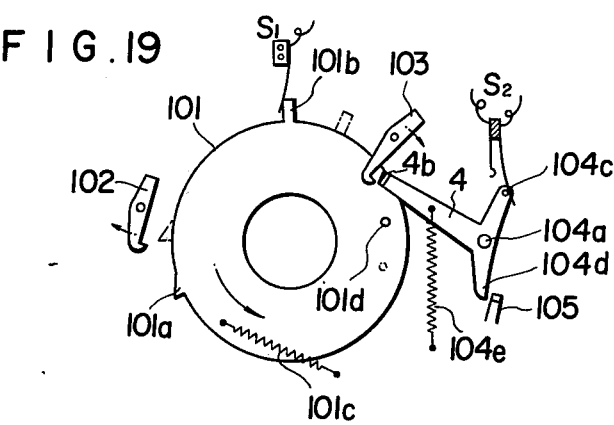
FIG. 19 is a fragmentary front elevational view of the shutter mechanism constructed in accordance with the invention.

FIG. 19 illustrates one example of the practical lens shutter with mechanical governor from which the count start signal and flash tube trigger signal of the flash energy control circuit can be extracted by the use of a connector. When a shutter button not shown is depressed, a lock pawl 102 is disengaged from a tooth 101a of a sector ring 101, so that the sector ring 101 is rapidly turned in a counterclockwise direction under action of a helical spring 101c to open rapidly the shutter blades, thereupon the projection 101b is brought into contact with the switch $S_1$ insulatingly mounted to effect the closure of the switch by grounding. Upon closure of the switch $S_1$, the charging of the count condenser of the flash energy control circuit starts. On the other hand, in synchronization with the disengagement of the lock pawl 102, another lock pawl 103 is disengaged from the edge 104b of a triple arm lever 104. The lever 104 is pivotally mounted on a pivot pin 104a, being urged by a herical spring 104e to turn in a counterclockwise direction, but the arm 104d is arrested at the end by part of a mechanical governer comprising gears, an escape wheel and an anchor. After a predetermined time interval set in the mechanical governor has passed, the arm 104d is disengaged from the part 105, so that the lever 104 is turned in a counter clockwise direction to move the insulated pin 104c planted on the other arm of the triple arm lever 104 to the left, thereupon a switch $S_2$ is closed to trigger the flash tube. After the closure of the switch $S_2$, the arm 104b strikes the pin 101d planted on the sector ring 101 and then turns the sector ring in a clockwise direction to close rapidly the shutter blades. In order to secure about 1 ms. for the delay of the turning movement of sector ring from the instant at which switch $S_2$ is closed, the shutter mechanism may be constructed as permitting the governer to control the turning movement of the lever 104. Illustrations of the detail of the charge mechanism are omitted.

Figure 20:
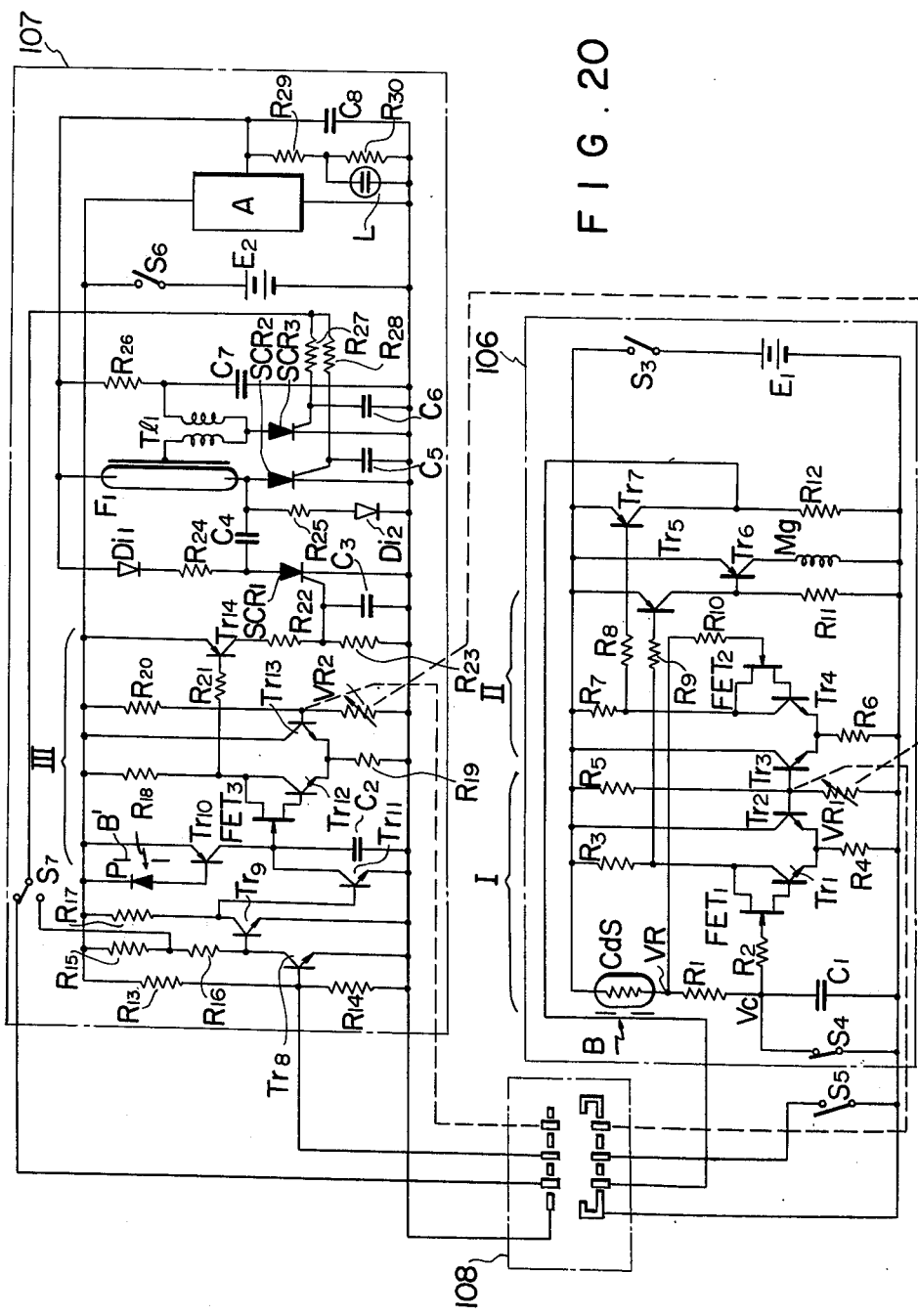
FIG. 20 is a diagram of the control circuit of an electrically time shutter having the same function as that of the shutter mechanism shown in FIG. 19.

The circuit shown in FIG. 20 is adapted for the apparatus comprising an electric governer device incorporated in the camera, a flash device constructed as an independent component from the camera, and a connector (an actuator shoe of the flash device) for interconnecting the both devices. The electric governer device comprises an appropriate exposure control circuit means comprising a time constant circuit portion having the resistor of the photoresponsive element (for example, cadmium sulfide photocell CdS) and a condenser $C_1$, and a voltage detecting circuit portion 106 which is capable of detecting the voltage of the charged condenser of the time constant circuit portion and of deriving a rear shutter plane running signal, and a flash trigger signal generating circuit means which commands the initiation of energization of the flash device in a last fraction of the exposure interval, the fraction being sufficiently longer than the duration of energization of the flash tube, for example, in the last one millisecond before the termination of exposure. The time constant circuit portion is constructed as including a resistor $R_1$ connects between the photoresponsive element CdS and the condenser $C_1$. The connection point between the element CdS and resistor $R_1$ is connected to a voltage detector circuit, while the connection point between the resistor $R_1$ and condenser $C_1$ is connected to another voltage detector circuit having the same detection voltage level as that of the former. Therefore, the time variable voltages at the connections are given by the following formulae.

For the time variable voltage $V_R$ at the connection between the element CdS and the resistor $R_1$, $$V_R = E\left\{1 - \frac{R_0}{R_0 + R_1} e - \frac{t}{C_1(R_0 + R_1)}\right\}$$

for the time variable voltage $V_C$ at the connection between the resistor $R_1$ and the condenser $C_1$ $$V_O = E\left\{1 - e^{-\frac{t}{C_1(R_0 + R_1)}}\right\}$$

wherein $R_O$ is the resistance of the photoresponsive element CdCdS, $R_1$ is the resistance of the resistor $R_1$, $C_1$ is the capacitance of the condenser $C_1$, and E is the voltage of the power source.

The time intervals necessary for the time variable voltages to reach a predetermined level $V_O$ counting from the instant at which the switch $S_4$ which is short-circuited by the condenser $C_1$ is turned off, respectively designated by $t_R$ and $t_C$ are given by the following formulae $$t_R = C_1(R_0 + R_1) \log_e \left(\frac{R_0}{R_0 + R_1}\right)\left(\frac{E}{E - V_O}\right)$$

-continued $$t_0 = C_1(R_0 + R_1) \log_e \left( \frac{E}{E - V_0} \right)$$

Hence $$t_R - t_C = t_0 = C_1(R_0 + R_1) \log_e \left( \frac{R_0 + R_1}{R_1} \right)$$

If $R_1$ is constant and $R_0 \gg R_1$, then the time difference $t_0$ is maintained constant with the variation of resistance $R_0$. Therefore, the time constant circuit portion provides two electrical signals, one of which is extractable from the connection between the resistor $R_1$ and condenser $C_1$ to control the exposure interval in accordance with the subject luminance, the other is extractable from the connection between the element $CdS$ and resistor $R_1$ to control the initiation of energization of the flash tube. In the figure, the circuit portion enclosed by dot-dash lines 106 is an example of the combination of the exposure control circuit and the flash trigger control circuit, the circuit portion enclosed by dot-dash lines 107 is an example of the flash device of the computer strobo type which is capable of controlling the total flash energy by the use of a photoresponsive element of high responsivility such as silicon photocell arranged to be exposed to the light from the subject being photographed which is positioned at the central portion of the frame of film, and the connection which is indicated at 108 may be a flash actuator shoe.

Consideration will be given to the operation of the circuit herebelow. When a shutter release button not shown is depressed, firstly the main switch $S_3$ is turned on to supply a current to the circuit. In this circumstance, the count switch $S_4$ remains on so that the input of the voltage detector circuit (I) comprising a field effect transistor $FET_1$, transistors $Tr_1$, $Tr_2$ and $Tr_5$, and resistors $R_2$, $R_3$, $R_4$, $R_9$ and $R_{11}$ is zero, being lower than the reference voltage $V_0$ established at the connection between the resistor $R_5$ and a variable resistor $VR_1$ of which the resistance value is varied in accordance with the sensitivity of film, thereupon the transistor $Tr_5$ is driven to conduction to energize the electromagnet $Mg$ so that the rear shutter plane is arrested against running. On the other hand, the time variable voltage $$V_R \left( = \frac{R_1 \cdot E}{R_0 + R_1} \right)$$

also is lower than $V_0$, so that the voltage detector circuit (II) comprising field effect transistor $FET_2$, transistors $Tr_3$, $Tr_4$ and $Tr_7$ and resistors $R_6$, $R_7$, $R_8$, $T_{10}$ and $R_{12}$ does not generate to the flash trigger signal. Secondly when the shutter release button is further depressed to the bottom, the front shutter plane is released from the blocking position to start exposure, thereupon the count switch $S_4$ is turned off in synchronization therewith. As a result, a current of which the intensity is dependent upon the subject luminance flows by way of the photoresponsive element $CdS$ and the resistor $R_1$ to the condenser, being stored therein. Thus the exposure interval control starts.

When the front shutter plane has run to the fully open position, a synchronous switch $S_6$ is turned on, thereby the time constant circuit of the flash energy control device comprising the photoresponsive element P of fast responsibility and the condenser $C_2$ is made operative, so that the output current of the element P for spot photometry is amplified by a transistor $Tr_{10}$ is stored on the condenser $C_2$. The charging rate of the condenser $C_2$ depends upon the intensity of the natural illumination of the subject as shown in FIG. 18. On the other hand, when the time variable voltage at the connection between the photoresponsive element $CdS$ for overall photometry and the resistor $R_1$, these circuit elements together with the condenser $C_1$ constituting the time constant circuit portion of the exposure control circuit of the camera has reached the reference voltage $V_0$ established at the connection between the resistor $R_5$ and the variable resistor $RV_1$ in the last predetermined fraction of the necessary exposure interval, the voltage detector circuit (II) is made operative to generate a flash trigger signal which is transmitted from the camera to the flash device, thereupon the flash tube is triggered to fire. After the above-mentioned fraction of time interval has passed from the instant at which the flash trigger signal is generated, that is, when the resultant exposure has reached the predetermined level, the time variable voltage at the connection between resistor $R_1$ and condenser $C_1$ overcomes the reference voltage $V_0$ to make operative the voltage detector circuit thereby transistor $Tr_6$ is reverse biased to its hot-conducting state to deenergize the electromagnet $Mg$, so that the rear shutter plane is released from the blocking position to terminate the exposure of film. Meanwhile, the flash energy control circuit of the flash device is made operative in synchronization with the closure of the synchronous switch $S_6$ which is turned on when the front shutter plane has taken the fully open position, measuring and integrating in the spot photometric mode the natural light reflection from the subject until the photoresponsive element P is exposed to the flash light reflection. (After the initiation of energization of the flash tube, natural plus flash complex light reflection is measured and integrated by the flash entry control circuit). When a flash trigger signal which is transmitted from the camera to the flash device is applied by way of resistors $R_{27}$ and $R_{28}$ to the gates of silicon controlled rectifiers $SCR_3$ and $SCR_2$, the rectifiers $SCR_2$ and $SCR_3$ are driven to conduction. As a result, a high voltage is induced in the flash tube $F_1$ by the trigger coil $Tl_1$ to ionize the gas in the flash tube $F_1$, so that a current is allowed to flow through the flash tube $F_1$, thereby intense flash limit is emitted wherefrom. When the integrated flash reflection from the subject illuminated by the intense flash light reaches such a level as to effect the consistent exposure for the luminance of the subject, that is, when the charging voltage of the time constant circuit comprising fast responsive photoresponsive element P, transistor $Tr_{10}$ and condenser $C_2$ overcomes the voltage $V_0'$ established at the connection of the resistor $R_{20}$ and variable resistor $VR_1$, at which voltage the voltage detector circuit (III) comprising a field effect transistor $FET_3$, transistors $Tr_{12}$, $Tr_{13}$ and $Tr_{14}$ and resistors $R_{18}$, $R_{19}$, $R_{20}$, $R_{21}$, $R_{22}$ and $R_{23}$, a flash quench signal is applied to the gate of a silicon controlled rectifier $SCR_2$ to drive the rectifier $SCR_2$ to nonconduction. As a result, the currect flowing through the flash tube $F_1$ is cut off to terminate the firing. After that, the rear shutter plane is released from the blocking position to effect correct exposure. As described above, when picture is photographed under ambient natural light, the overall photometry is carried out for the exposure control, while when the luminance of the subject being photographed is insufficient for effecting consistent exposure with respect to the luminance of the environment, the insufficient luminance is compensated by the addition of the flash illumination from the flash device, so that correct exposure can be made for both of the luminance of the subject and the luminance of the environment.

In order to simplify the operation in flash photography (in order to remove the necessity of setting the variable resistor $VR_2$ of the flash device to a conformance with the sensitivity of film), the resistor $R_{20}$ and variable resistor $VR_2$ constituting the reference voltage establishing circuit may be removed from the voltage detector circuit (III) of the flash device, and instead the base electrode of the transistor $Tr_{13}$ of the voltage detector circuit (III) is directly connected through a lead indicated at dot lines to the connection at which the reference voltage for the voltage detector circuits (I) (II) is established. Further a portion of the circuit shown in FIG. 20 may be modified so as to permitting the flash quench signal to cause the running of the rear shutter plane. In FIG. 12, the circuit is illustrated as including three field effect transistors $FET_1$–$FET_3$, fourteen transistors $Tr_1$–$Tr_{14}$, three silicon rectifier elements $SCR_1$–$SCR_3$, two diodes $Di_1$, $Di_2$, one fast responsive photoresponsive element P, one photoconductive photoresponsive element CdS (of which the responsibility is not so fast), thirty resistors $R_1$–$R_{30}$, eight condensers $C_1$–$C_8$, one flash discharge tube $F_1$, one trigger coil $Tl_1$, one neon lamp 1, two aperture value information setting diaphragm means or filters, B, B' which control the quantity of light passing therethrough in response to the manual or automatic aperture control of the diaphragm device of the photographic lens, one booster circuit A, two battery sources $E_1$, $E_2$, and five switches $S_3$–$S_7$, namely a main switch $S_3$, a count sharter switch $S_4$, a synchronous switch $S_5$, a main switch $S_6$, and a transfer switch $S_7$. The transfer switch $S_7$ is changed over according to whether the camera combined with the flash device is a specific camera as shown above, or a universal camera.

Figure 21:
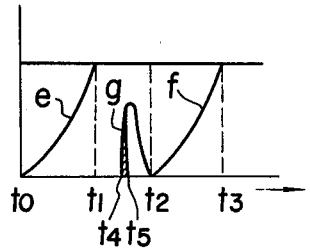
FIG. 21 are curves illustrating a certain operating principle of the exposure control system according to the present invention using a focal plane shutter.

Even when the flash device of structure described above is used in combination with a universal camera having an exposure control circuit other than that described above, although the intensity of natural light illumination of the subject is not substantially taken into account except that exposure interval in very short, a sufficient accuracy of flash exposure control can be made. In this case, preparatory to photographing, the transfer switch $S_7$ is set to the position opposite to that shown in the figure, the diaphragm means (or filter) B' in front of the photoresponsive element P is set to the position corresponding to the aperture value of the photographic objective, and the resistance value $VR_2$ is adjusted in accordance with the sensitivity of film. As soon as the synchronous switch (corresponding to $S_6$) of the universal camera is closed, the flash tube $F_1$ is triggered to fire. Upon closure of the synchronous switch, the flash energy control circuit also is made operative. When the total flash energy has reached an appropriate level, the energization of the flash tube is automatically terminated. As far as the circuit shown in FIG. 20 is concerned, it is necessary to insert the film sensitivity information setting ($VR_2$) and the aperture information setting (B') into the circuit of the flash device as well as into the exposure control circuit of the camera. However, as has been already stated, it is possible to urge variable resistor $VR_1$ to cooperate with variable resistor $RV_2$. Further, the setting of the variable resistor $VR_1$ may be modified so as to take into account the aperture information as well as the sensitivity of film, thereby no use is made of both the diaphragm means B, B', so that the necessity of inserting the film sensitivity and aperture value information settings into the flash device is precluded to simplify the operation in flash photography. FIG. 21 illustrates a relationship between the focal plane shutter operating period and the duration of a light flash with respect to the time delay. When the shutter button is depressed, the front shutter screen starts to run at time $t_0$ from its blocking postion, thereupon exposure of film begins to take place from one side of the frame, and the opened area increases as shown by curve $e$, reaching the maximum at time $t_1$. In a manually selected time interval, or in a predetermined time interval which is controlled by an automatic exposure control apparatus, the rear shutter screen starts to over the fully opened focal plane from one side, and the opened area decreases are shown by curve $f$ having the same form as that of curve $e$, reaching zero at time $t_3$ to terminate the exposure of film.

On the other hand, the flash tube is triggered at time $t_4$ in a period of about one millisecond prior to time $t_2$, and quenched at time $t_5$ at which the sum of the integrated reflections of ambient natural light and flash light reaches an appropriate level. Unlike the lens shutter, the focal plane shutter cannnot be controlled to provide a time interval between times $t_0$ and $t_1$ (as well as time $t_2$ and $t_3$) less than about 10 milliseconds, the length of the time interval being inneglible, so that the flash energy control circuit of the flash device should be set so as to begin the counting not at time $t_1$ but at time $t_0$. In a flash photography application wherein the exposure interval is always selected at constant, for example, 1/60 second, and the time interval between times $t_1$ and $t_2$ during which the shutter is fully opened is adjusted to one to three milliseconds, the flash trigger time may be brought into coincidence with the time $t_1$.

In this case, before the flash tube is triggered, the flash energy control circuit is driven to operate at time $t_0$. For the triggering of the flash tube, the synchronous switch of the camera may be utilized. For the release of the rear shutter screen, the flash quench signal which generates at time $t_5$ may be utilized, thereby the time $t_5$ is brought into coincidence with time $t_2$ as in the case of the lens shutter.

Figure 22:
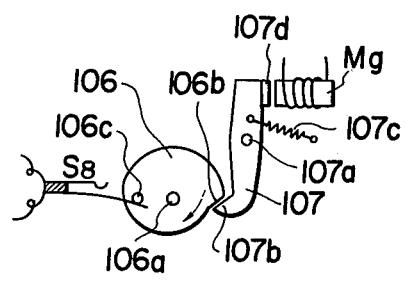
FIG. 22 is a sectional view of the main part of the shutter mechanism which operates in such a manner as shown in FIG. 21.

FIG. 22 illustrates an interconnecting relationship between a rear screen drum of the focal plane shutter adapted to operate as an electrically timed shutter, and a flash trigger switch. The rear screen drum is provided with a disk 106 affixed thereto of which the rotation is controlled through a lock pawl 107 by an electromagnet Mg connected to the electrically timed shutter circuit. $S_6$ denotes a flash trigger switch. When the shutter button is depressed, a current flows through the electromagnet Mg to attract an integral extension 107d' of the lock pawl 107 pivotally mounted on a pivot shaft 107a, while the other end 107b is allowed to arrest the disk 106 at a portion 106b. When the front screen is released from the blocking position, a rear screen drum locking member not shown is released and instead it is arrested by the electromagnet Mg. At the same time, the electrically timed shutter circuit begins to count. In a predetermined time interval, a current flowing through the electromagnet Mg is cut off, so that the disk 106 is rotated in a clockwise direction under action of a charged spring, pushing away the lock pawl 107 urged by a weak helical spring 107c to turn in a clockwise direction, thereby the rear screen assumes the shutter closed position to terminate the exposure of film. In order to initiate the energization of the flash tube, there is provided the switch $S_6$ and an insulating pin 106c planted on th disk 106, both being so arranged that when the tip of the rear screen appears in the effective area of the frame, the pin 106c is disengaged from the movable contact of the switch $S_6$ to close it. The time interval between the initiation of the rear shutter running and the instant at which the switch $S_6$ is closed can be effectively utilized to extract the flash trigger signal from the shutter close signal, thereby the device is simplified. In order to bring the instant at which the electrically timed shutter circuit generates the shutter close signal into coincidence with the time $t_2$, it is necessary to generate the shutter close signal faster than the time $t_2$, because of the inertias of the electromagnet and the interconnecting mechanism. For this purpose, the electrically timed shutter circuit may be constructed so as to start the counting faster than the time $t_0$ at which the shutter starts to open.

Figure 23:
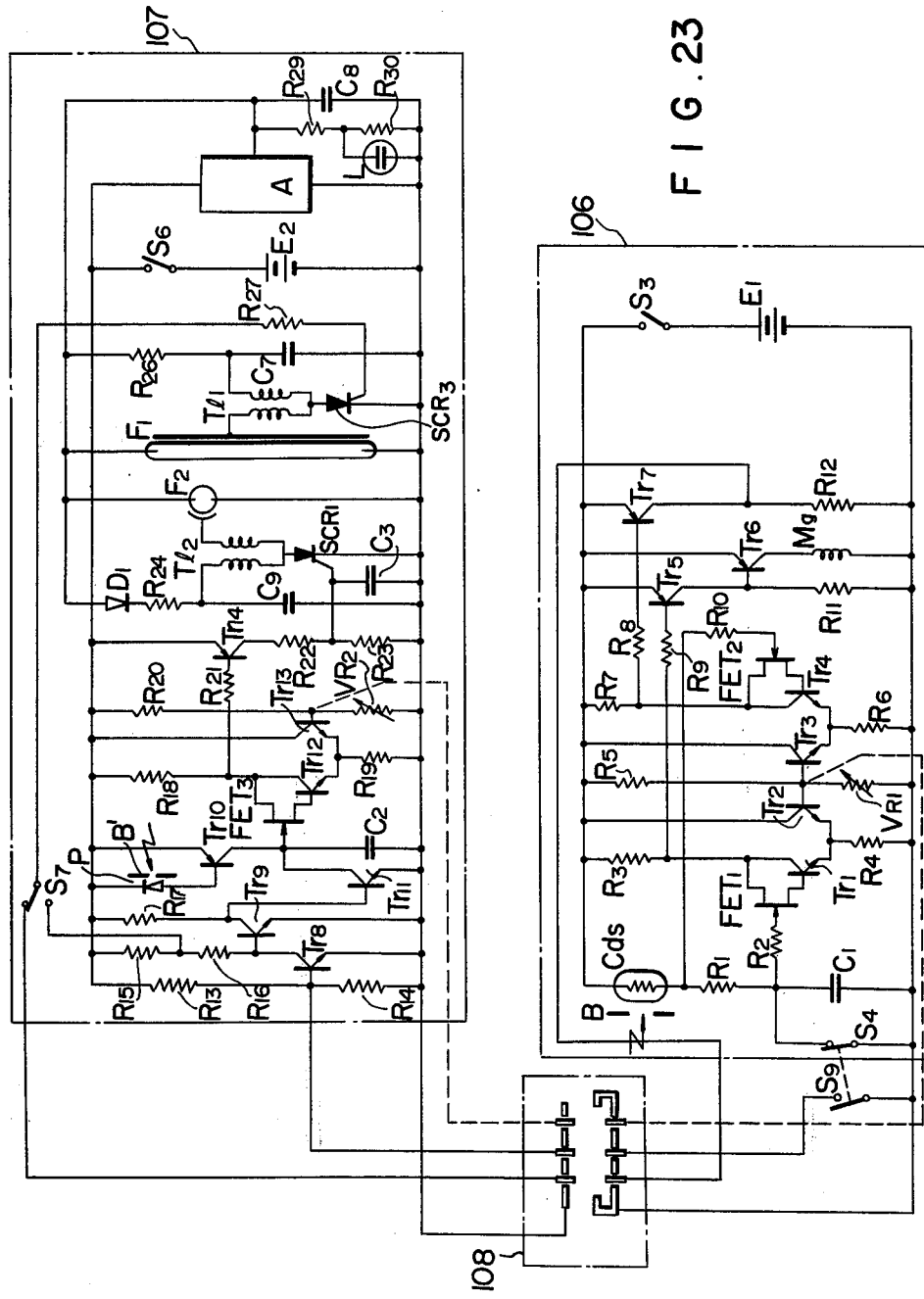
FIG. 23 is a diagram of the control circuit of the electrically timed shutter having the same function as that of the mechanism shown in FIG. 22.

FIG. 23 illustrates one example of the shutter speed control circuit adapted for use with the focal plane shutter described in connection with FIG. 21, and a flash energy control circuit of the flash device. As explained in FIG. 20, the shutter speed control circuit also causes the flash tube to be triggered in a certain period of time prior to the generation of the shutter close signal, and after the insufficient intensity of natural light illumination of the subject is compensated for by the addition of the flash light illumination, the total energy of flash light emitted from the flash device is controlled by the use of a photoresponsive element P of fast responsibility. The circuit shown in FIG. 23 differs from that shown in FIG. 20 particularly in the following two points: (1) The running periods of the front and rear shutter screens which are very long as compared with the lens shutter are taken into account, and (2) The quantity of flash energy of the flash tube of the flash device is controlled by use of a by-pass discharge tube but not the silicon recrifiers SCR's. In other words, unlike the circuit shown in FIG. 20 of which the flash energy control circuit is made operative by an electrical signal given from the synchronous switch which is turned on when the shutter is fully opened, the circuit shown in FIG. 23 controls the initiation of operation of the flash energy control circuit by the use of a switch $S_9$ which is turned on in response to the closure of the count switch for controlling the exposure interval but not by the use of the synchronous switch. However, as has been already mentioned in connection with FIG. 21, in a flash photography application wherein the time interval between times $t_1$ and $t_2$ during which the shutter is fully open is adjusted to as short as 1-3 milliseconds, the flash tube may be triggered at time $t_1$ but not at time $t_4$ without effecting a considerable decrease in the accuracy of flash exposure control. Namely, in some cases, the flash tube may be triggered in synchronization with the closure of the synchronous switch. Further, when a focal plane shutter of which the screen running speed is so fast that the period between times $t_0$ and $t_1$ is negligible as in the case of the lens shutter is employed, the switch may be replaced by a switch of the type corresponding to the switch $S_s$ shown in FIG. 20.

The operation of the circuit is identical to that of the circuit shown in FIG. 20. The discussion therefore has been omitted. In a camera incorporating the focal plane shutter, the mirror is pivoted upwards to block the path of light to the finder system including the photoresponsive element CdS when the shutter is opened. Therefore, the circuit shown in FIG. 23 is adapted for use with the external photometric system wherein the photoresponsive element is arranged outside the photographic lens system. But if a memory means of known structure is employed, the light passing through the lens system can be utilized for the photometry. The circuit is illustrated as including 30 resistors $R_1$–$R_{30}$, a variable resistor $VR_2$, a photoresponsive element CdS for the overall photometry, a photoresponsive element P of fast responsivility for spot photometry, nine condensors $C_1$–$C_9$, two field effect transistors $FET_1$, $FET_2$, fourteen transistors $Tr_1$–$Tr_{14}$, two silicon rectifiers $SCR_1$, $SCR_3$, a neon tube L, a flash tube $F_1$, a by-pass discharge tube $F_2$, two trigger coils $Tl_1$, $Tl_2$, a diode $Di_1$, an electromagnet Mg, a diaphragm means B′ for aperture value information setting, two battery sources $E_1$, $E_2$, and five switches, namely a main switch $S_3$ of the camera, a count starter switch $S_4$, a main switch $S_6$ of the flash device, a transfer switch $S_7$ for a specific camera and universal camera, and a switch $S_9$ for initiation of operation of the flash energy control circuit of the flash device. In some cases, the switch $S_9$ may be replaced by the synchronous switch, when the contribution of ambient natural illumination to the exposure of film until the shutter is fully opened is taken as being negligible for the accuracy of flash exposure control.

As will be seen from the foregoing description, the present invention contemplates the use of a flash trigger means for initiating the energization of a flash tube of the flash device just before the shutter is closed, and a flash energy control means for controlling the quantity of flash energy in accordance with the reflection of the natural plus flash complex light. Therefore, the flash exposure control apparatus constructed in accordance with the invention is of simple structure, nevertheless flash photography with high accuracy of exposure control is possible. By the combination with an exposure control apparatus for normaly photography, correct exposure can be made not only for the luminance of the subject but also for the luminance of the background scene. Further even when the flash device having a transfer switch incorporated therein according to the invention is used in combination of a universal camera having a synchronous switch, it is possible to carry out the so-called automatic flash photography. If the latter camera has an exposure control apparatus for normal photography, a slight over-exposure due to the contribution of the ambient natural light illumination is effected, but exposure values appropriate for the luminance of the background scene and nearly appropriate for the luminance of the subject are developed. Thus, the exposure interval preselection flash exposure control system of the invention develops an accurate exposure value for any flash photographic situation encountered.

What is claimed is:

1. An exposure interval preselection flash exposure control system for a camera, said camera including a shutter mechanism, comprising:
   an adjustable camera-diaphragm device for limiting an exposure light in accordance with a scene brightness under natural light, said device including:
   photoresponsive means having a first photoresponsive element responsive to the luminance of objects to be photographed;
   shutter interval setting means for permitting the preselection of shutter speed;
   a computing circuit coupled to said photoresponsive means and shutter interval setting means for computing the exposure aperture of the diaphragm corresponding to circuit parameters derived from said photoresponsive means and shutter interval setting means;
   a diaphragm aperture adjusting means connected with said diaphragm device for setting the aperture value of the diaphragm, the adjusting means being operatively connected to said computing circuit; and
   a means connected with said diaphragm aperture adjusting means for generating an electrical signal correspondng to a diaphragm aperture adjusted value, and
   a flash device including means for controlling the amount of flash energy in response to the exposure aperture value determined by said computing means, said flash energy control means including:
   means for forming a control signal in accordance at least, with the distance to the subject of principal photographic interest, said forming means including a second photoresponsive element responsive to the luminance of the subject of principal photographic interest in a scene to be photographed the element having a delaying characteristic the value of which is representative of the luminance of object after a significant time period so that the element is non-responsive to the flashing light constituent of the luminance of object;
   timing means electrically coupled to said forming means and said electric signal generating means for a measure of an interval of time correspondng to the control signal in consideration of the value of said second photoresponsive element, whereby an appropriate exposure is provided for the main portion and other portion of the object by illumination of external light and to the main portion of the subject by illumination of an auxiliary light and the external light corresponding to the preset shutter speed respectively;
   switching means, electrically coupled to said timing means, having the duration of its conducting state controlled by the time interval measure;
   power source means for providing flash energy; and
   flash discharge means coupled by way of said switching means to said power source means.

2. An exposure interval preselection flash exposure control system as in claim 1, wherein said shutter interval setting means of said computing means includes an electrically controlled shutter timing circuit which is electrically coupled to said photoresponsive means for controlling the shutter interval.

3. An exposure interval preselection flash exposure control system as in claim 1 wherein said flash energy control means is provided with an auxiliary diaphragm means located in front of the second photoresponsive element, said auxiliary diaphragm means having an aperture opening which is controlled in accordance with the exposure aperture setting of the diaphragm device.

4. An exposure control system for a camera employing a supplementary light illumination device having a flash lighting source for providing an appropriate exposure for a scene object which is illuminated by an external light, comprising:
   a camera diaphragm device;
   a diaphragm aperture adjusting means operatively coupled with said diaphragm device for controlling a diaphragm aperture value;
   a shutter device, said shutter device including photoelectric means arranged to be uniformly sensitive to the light of a scene object to provide an electrical output corresponding to the brightness of a secen object;
   means for determining shutter speed being connected with said shutter device to provide a predetermined value for the shutter speed and the film sensitivity;
   a first operational means having an input responsive to said shutter speed means and said photoelectric means, and having an output coupled to said diaphragm aperture adjusting means, for determining said diaphragm value so as to provide an appropriate exposure corresponding to the brightness of a scene object and the determined shutter speed;
   a second photoelectric means arranged to be sensitive to only the light from the main portion of a scene object for providing an electrical output by sensing the light from said main portion;
   a distance setting means for generating an electrical output corresponding to the distance to a scene object; and
   a second operational means coupled to said diaphragm aperture adjusting means and having a means for generating an electrical output corresponding to the determined value of said diaphragm aperture adjusting means and being coupled to said second photoelectric means and said distance setting means for controlling the amount of light of supplementary illumination which provides an appropriate exposure to the main portion of a scene object corresponding to the distance to a scene object, a diaphragm aperture and the brightness at the main portion of a scene object;
   whereby an appropriate exposure is provided for the main portion and other portions of a scene object based on illumination of external light and to the main portion of a scene object based on illumination of a supplementary light corresponding to the preset shutter speed respectively;
   wherein said first operational means includes a variable resistor for varying the resistor value thereof to be interlocking with the shutter operating means, and a metering means connected electrically with said variable resistor and the first photoelectric means, and provided with a metering pointer which is connected operatively with said diaphragm aperture adjusting means for adjusting the diaphragm aperture value corresponding to the deflection angle of said pointer;

and wherein said first operational means further includes a switching means for a photographing mode, and wherein said distance setting means has a second variable resistor for selectively changing said first photoelectric means and said second variable resistor through said switching means; and wherein said second operation means further comprises a flash time determining circuit which includes:

a switching circuit connected with said flash light source, and a control circuit for providing a control signal to said switching circuit, said flash time determining circuit including an integration circuit having both a condenser connected with said second photoelectric means, means for generating a reference output corresponding to said diaphragm adjusting aperture means, and a comparison circuit having first and second comparing inputs for connecting the generating means with the first comparing input of said comparison circuit as well as connecting said integration circuit with the second comparing input, said comparison circuit further being connected with said switching circuit, whereby the light amount of the flash light source is adapted to be automatically controlled by control of said switching circuit.

5. An exposure control system for a camera according to claim 4, wherein said first photoelectric means is positioned so as to sense the light passing through the objective lens of a camera and the second photoelectric means is positioned so as to sense the light of the outer part through the objective lens of a camera.

6. An exposure control system for a camera equipped with a supplementary light illumination device having a flash light source for providing an appropriate exposure to a scene object which is illuminated by an external light, comprising:

a photoelectric means for sensing the light from at least one portion of a scene object and for converting said sensed light into an electric signal;

a shutter device;

a starting means interlocked with said shutter device for actuating said supplementary illumination device to emit light just before the closing of the shutter;

an integration circuit, connected with said photoelectric means, to commence integration action at the beginning of the shutter opening, the circuit being interlocked with said shutter device and integrated with the electrical quantity in accordance with the electrical signal of said photoelectric means based on the external light on the scene object and the additional light from the scene object illuminated by the illumination device during the shutter opening period;

a control circuit coupled to said integration circuit for generating a signal to discontinue flash lighting;

a switching means responsive to the output of said control circuit wherein the conduction of said switching means is controlled by the output of said control circuit, said switching means being effective to discontinue the flashing of said flash light source, whereby both the external light exposure and the additional light exposure taken in consideration of the external light provide the appropriate exposure 7. An exposure control system for a camera employed together with an auxiliary light illumination device having a flash light source for taking a photograph, comprising:

a camera-associated portion including:

a shutter device for setting and determining an exposure time for photographing;

a preset shutter interval adjusting means connected with said shutter device and capable of presetting a shutter interval prior to photographing;

a diaphragm device which provides variable exposure openings;

a diaphragm aperture adjusting means connected with said diaphragm device and adjustable for setting the aperture value of the diaphragm;

a photosensitive means for uniformly sensing the light flux from a scene object, said photosensitive means having a photoelectric element for generating an electrical output corresponding to the amount of said sensed light flux;

a distance information setting means having an input means for generating an electrical output corresponding to the distance to a scene object from a camera, and a diaphragm aperture operation means connected with said preset shutter adjusting means and said photosensitive means for generating an output corresponding to a diaphragm aperture value which provides an appropriate exposure corresponding to preset shutter value and the output of each of said means, and is further connected with said diaphragm aperture adjusting means to be adjustable for said diaphragm device corresponding to said output having a signal forming means associated with said diaphragm aperture adjusting means to produce an electrical signal in accordance with said output; and a means connected with said diaphragm aperture adjusting means for generating an electric signal corresponding to a diaphragm aperture adjusted value;

an auxiliary light illumination portion including:

a flash light source;

a power source means for supplying energy;

a switching means connected with both said flash light source and power source means for controlling the opening and closing actions thereof to ultimately control the amount of light energy emitted;

a trigger means connected operatively with said shutter device for transmitting a trigger signal to said flash light source a second photosensitive means for sensing the light flux from at least a main portion (to be illuminated by the flash light source) of the scene object, said photosensitive means having a photoelectric element for generating an electrical output corresponding to the amount of said sensed light flux without an auxiliary light; and a circuit means for generating a signal to control the flash light amount and being provided with a control input terminal connected electrically with said distance information input means and said electric signal generating means, said circuit means also provided with a control output terminal connected with said switching means for discontinuing flashing of the flash light source through said switching means after emitting an amount of light corresponding to the distance setting information as well as the diaphragm aperture adjusted value and the light flux from the object before the emitting of the auxiliary light by said flash light source.

8. An exposure control system for a camera according to claim 7, wherein said circuit means for generating a control signal further includes:
an alarm indication means connected selectively with the control output terminal of said control signal generating circuit means for indicating whether flash light photography is permissible by flickering of said means, and a switching means connected with the control output terminal for connecting said control output terminal selectively with said switching means and said alarm indication means.

9. An exposure control system for a camera according to claim 7, wherein said distance information input means is a variable resistance means which is variable corresponding to the distance between a scene object and a camera, and said control signal generating circuit means is a second variable resistance means which is variable corresponding to the diaphragm aperture adjusted value, and wherein said control signal generating circuit means is provided with a comparison circuit, the comparative inputs of which are connected with said first and second variable resistors respectively.

10. An exposure control system for taking a photograph with the aid of an auxiliary light illumination, comprising:
a shutter device including a first shutter adjusting means for effecting an exposure action by opening of the shutter at the time of photographing;
a shutter interval adjusting means including:
a photoelectric means for sensing the light of a scene object and generating an electric signal corresponding to the sensed light flux;
an electronic delay circuit connected with said photoelectric means and provided with an integration circuit having a condenser, and a switching circuit provided at the input of said delay circuit; and
electromagnetic means connected with the output of said delay circuit and able to control the closing action of said shutter device;
a diaphragm device;
an adjusting means for said diaphragm device which includes:
a shutter speed information input means which is variable and corresponds to the preset value of said shutter device;
computing and operation means for a diaphragm aperture value which is connected to said photoelectric means and said information input means for computing the diaphragm value providing appropriate exposure;
a diaphragm information output means for generating an electric signal corresponding to the output of said computing and operation means, said information output means being connected with said switching circuit for varying the threshold value; and
a flash light device having an illuminating means, a switching means coupled to the illuminating means and a timing circuit means coupled to the switching means, the timing means being connected with said diaphragm information output means to vary the flash light illumination amount corresponding to the output thereof.

11. An exposure control system for a camera employed together with an auxiliary light illumination device having a flash light source for taking a photograph, comprising:
a shutter device for setting and determining the exposure time for taking a photograph;
a preset shutter interval adjusting means connected with said shutter device and capable of presetting a shutter interval prior to photographing;
a diaphragm device for determining the exposure opening diameter, said opening diameter being adapted to be adjustable;
a diaphragm aperture adjusting means connected with said diaphragm device and adjustable for setting the diaphragm aperture value;
a photosensitive means for sensing the light flux from a scene object and includes a photoelectric element which provides an electric output corresponding to the amount of sensed light;
an operation and computing circuit means for computing the diaphragm aperture and being connected with both said preset shutter adjusting means and said photosensitive means as well as being connected with said diaphragm aperture adjusting means to provide an appropriate exposure corresponding to the set value of said preset shutter adjusting means and the output of said photosensitive means,
said operation and computing circuit means further provided with a change-over means for changing a flash-autophotographing mode to a day-light flash-photographing mode vice versa, and a distance information setting means having an input means for generating an electrical output corresponding to the distance to scene object from a camera, said change-over means being selectively connected with one of said photosensitive means and said input means so as to make effective thereof in the circuit means,
said diaphragm aperture adjusting means being connected with said operation and computing circuit means,
signal forming means associated with said diaphragm aperture adjusting means for forming an electrical signal in accordance with the diaphragm value to be adjusted, and
said light illumination device comprising timing means being electrically couplable to said signal forming means for a measure of an interval of time corresponding to the electrical signal, the timing means having a distance-to-object signal forming means forming an electric signal, a flash light source and switching circuit connected with said flash light source and said timing means for terminating the flash illumination.

12. An exposure control system for a camera employed together with an auxiliary light illumination device having a flash light source for taking a photograph comprising:
A. the illumination device including:
a power source means connected with the flash light source for supplying energy thereto,
a trigger means connected operatively with the light source means for starting illumination thereof,
said power source means having a characteristic of applying an approximately predetermined amount of electric energy to the light source means for generating a corresponding flash light thereby;

a light control circuit coupled to the power source for variably adjusting the light quantity;

means for forming a control signal in accordance with the distance to the scene to be photographed, the forming means being connected with the light control circuit so as to adjust the light quantity of the light source corresponding to the distance;

B. the camera including:

a diaphragm device which provides variable exposure openings;

a photosensitive means for sensing the light flux from a scene object, the photosensitive means having a photoelectric element for forming an electric output corresponding to the amount of the sensed light flux;

C. exposure control circuit means coupled to the photosensitive means for computing the exposure aperture of the diaphragm corresponding to a circuit parameter derived fro the photosensitive means, the control circuit means including:

second meand for forming a control signal representative of a given aperture value of the diaphragm device which is determined by the amount of light which is emitted by said illumination device and is to be adjusted corresponding to the distance to the object;

a change-over means selectively connectable with one of the photosensitive means and the second forming means;

a computing circuit connectable with one of the photosensitive means and the second forming means through the change-over means;

means for inserting film-sensitivity information into the computing circuit; and a diaphragm aperture adjusting means operatively coupled with the diaphragm device for adjusting a diaphragm aperture value automatically, the adjusting means connected with the computing circuit, whereby the aperture of the diaphragm device is automatically set for proper exposure under flash photography.

13. An exposure control system for a camera according to claim 12, wherein the control circuit means further comprises film sensitivity setting means having a variable resistance means connected in the computing circuit.

14. An exposure control system for a camera according to claim 12, wherein the photosensitive means includes an auxiliary diaphragm device positioned before the photoelectric element, the diaphragm device having its aperture value adjusted in accordance with a preselected shutter speed.

15. An exposure control system for a camera according to claim 12, wherein the aperture adjusting means includes a galvanometer having a pointer and a mechanical scanning means connected operatively with the meter for detecting the pointer of the meter, which is associated with the diaphragm device and the second forming means is a resistor with a constant resistance value.

16. An exposure control system for a camera having an interchangeable objective lens employed together with an auxiliary light illumination device having a flash light source for taking a photograph comprising:

A. the camera including:

a camera diaphragm device;

a diaphragm aperture adjusting means operatively coupled with the diaphgram device for controlling a diaphragm aperture value;

a shutter device;

a first operational means having an input responsive to the shutter speed of the shutter device and a output coupled to said diaphragm aperture adjusting means, for determining the diaphragm value; and means for forming a control signal representative of the diaphragm aperture value to be determined, the forming means being associated with the adjusting means;

input means connected to the objective lens and the forming means for readjusting thereof so as to produce the control signal representative of the absolute diaphragm aperture value; and B. the illumination device including:

means for controlling the amount of flash energy in response to the diaphragm aperture value determined by the operational means, the control means including a second means for forming a second control signal in accordance, at least, with distance to the subject in a scene to be photographed;

timing means electrically coupled to the first and the second forming means for measure of an interval of time corresponding to both signals;

switching means, electrically coupled to the timing means, having the duration of its conducting state, controlled by the time interval measure;

power souce means for providing flash energy; and a flash discharge means coupled by way of said switching means to the power source means; and wherein the shutter device comprises a shutter internal setting means for permitting the preselection of shutter speed and a computing circuit coupled to a photoresponsive means and shutter internal setting means for computing the exposure aperture of the diaphragm corresponding to circuit parameters derived from said photoresponsive means and shutter interval setting means.

17. An exposure control system for a camera according to claim 16, wherein each of the first and the second forming means is a variable resistor means.

18. An exposure control system for a camera employed together with an auxiliary light illumination device having a flash light source for taking a photograph comprising:

diaphragm device which provides variable exposure openings;

means for adjusting the diaphragm device, operatively connected with the diaphragm device;

a shutter device for defining an exposure duration through the opening and closing thereof, said shutter device having a shutter drive associated therewith;

means for adjusting the exposure duration of the shutter drive connected with the shutter device;

manually operable means for manually preselecting one of said diaphragm adjusting means and said exposure duration adjusting means to a desired value thereof;

a photosensitive means for sensing scene light from an object to be photographed, the photosensitive means having a photoelectric element for forming an electric output corresponding to the amount of the sensed light;

exposure control circuit means coupled to the photosensitive means for computing the duration of the shutter device corresponding, at least, to the output of the photosensitive means, the circuit means being operatively connected with the shutter adjusting means;

electrical signal forming means, connected operatively with the diaphragm adjusting means for forming the signal corresponding to the adjusted diaphragm opening of the diaphragm device; and light control means connected with the signal forming means, the control means having means for forming a second control signal in accordance with the distance to an object to be illuminated by said auxiliary light illumination device in flash photography, for adjusting the flash light quantity variable corresponding to the adjusted diaphragm opening and the distance.

19. An exposure control system according to claim 18, in which the electrical signal forming means is a variable resistor.

20. An exposure control system according to claim 18, in which the light control means having means for forming a control signal in accordance with a distance to the scene to be photographed, whereby the flash light quantity is adjusted corresponding to the distance and the adjusted diaphragm opening.

21. An exposure control system for a camera having an interchangeable lens, employed together with an auxiliary light illumination device having a flash light source comprising:

a diaphragm device providing a variable exposure opening in the lens;

means for adjusting the diaphragm device operatively connected with the diaphragm device;

a shutter device for defining an exposure duration;

a photosensitive means positioned to receive scene light through the lens, first exposure control circuit means selectively coupled to the photosensitive means in a shutter preselection mode for computing the duration of the shutter device corresponding, at least, to the output of the photosensitive means and the preselected diaphragm opening value of the diaphragm device, the circuit being operatively connected with the diaphragm adjusting means, second exposure control circuit means selectively coupled to the photosensitive means in a diaphragm preselection mode for computing the diaphgram opening value of said diaphragm device corresponding, at least, to the output of the photosensitive means and the preselected duration of shutter device, the circuit means being operatively connected with the diaphragm adjusting means, means for adjusting the diaphragm device operatively connected with the diaphragm device, including an indicating means for indicating a diaphragm aperture value to be adjusted in a finder of the camera, manually operable means for adjusting the diaphragm device manually based on the indication of said indicating means and separable from the diaphragm adjusting means in a shutter duration preselection mode for adjusting the diaphragm device automatically;

electrical signal forming means, connected operatively with the diaphragm adjusting means for forming the signal corresponding to the adjusted diaphragm opening of the diaphragm device; and light control means coupled to the electrical signal forming means for variably adjusting the flash light quantity corresponding, at least, to the adjusted diaphragm opening in flash photography.

22. An exposure interval preselection flash exposure control system for a camera, said camera including a shutter mechanism, comprising:

an adjustable camera-diaphragm device for limiting an exposure light in accordance with a scene brightness under natural light, said device including:

photoresponsive means having a first photoresponsive element responsive to the luminance of objects to be photographed;

shutter interval setting means for permitting the preselection of shutter speed; and a computing circuit coupled to said photoresponsive means and shutter interval setting means for computing the exposure aperture of the diaphragm corresponding to circuit parameters derived from said photoresponsive means and shutter interval setting means; and a flash device including means for controlling the amount of flash energy in response to the exposure aperture value determined by said computing means, said flash energy control means including:

means for forming a control signal in accordance at least, with the distance to the subject of principal photographic interest, said forming means including a second photoresponsive element responsive to the luminance of the subject of principal photographic interest in a scene to be photographed;

timing means electrically coupled to said forming means for a measure of an interval of time corresponding to the control signal;

switching means, electrically coupled to said timing means, having the duration of its conducting state controlled by the time interval measure;

power source means for providing flash energy; and flash discharge means coupled by way of said switching means to said power source means;

wherein said shutter interval setting means of said computing means includes an electrically controlled shutter timing circuit which is electrically coupled to said photoresponsive means for controlling the shutter interval; and wherein said electrically controlled shutter timing circuit is provided with a condenser connected in series with said first photoresponsive means, said condenser and photoresponsive means constituting a time constant circuit, and wherein said time constant circuit is further provided with a resistance means connected in series with the condenser, said resistance means and the condenser constituting a delay circuit.

23. An exposure interval preselection flash exposure control system for a camera, said camera including a shutter mechanism, comprising:

an adjustable camera-diaphragm device for limiting an exposure light in accordance with a scene brightness under natural light, said device including:

photoresponsive means having a first photoresponsive element responsive to the luminance of objects to be photographed;
shutter interval setting means for permitting the preselection of shutter speed; and
a computing circuit coupled to said photoresponsive means and shutter interval setting means for computing the exposure aperture of the diaphragm corresponding to circuit parameters derived from said photoresponsive means and shutter interval setting means; and
a flash device including means for controlling the amount of flash energy in response to the exposure aperture value determined by said computing means, said flash energy control means including:
means for forming a control signal in accordance at least, with the distance to the subject of principal photographic interest, said forming means including a second photoresponsive element responsive to the luminance of the subject of principal photographic interest in a scene to be photographed;
timing means electrically coupled to said forming means for a measure of an interval of time corresponding to the control signal;
switching means, electrically coupled to said timing means, having the duration of its conducting state controlled by the time interval measure;
power source means for providing flash energy; and
flash discharge means coupled by way of said switching means to said power source means;
wherein said first photoresponsive element of said photoresponsive means is responsive to the brightness of the subject and said second photoresponsive element is formed around the first element and is responsive to the brightness of the background of the subject.

24. An exposure interval preselection flash exposure control system for a camera, said camera including a shutter mechanism, comprising:
an adjustable camera-diaphragm device for limiting an exposure light in accordance with a scent brightness under natural light, said device including:
photoresponsive means having a first photoresponsive element responsive to the luminance of objects to be photographed;
shutter interval setting means for permitting the preselection of shutter speed; and
a computing circuit coupled to said photoresponsive means and shutter interval setting means for computing the exposure aperture of the diaphragm corresponding to circuit parameters derived from said photoresponsive means and shutter intervals setting means; and
a flash device including means for controlling the amount of flash energy in response to the exposure aperture value determined by said computing means, said flash energy control means including:
means for forming a control signal in accordance at least, with the distance to the subject of principal photographic interest, said forming means including a second photoresponsive element responsive to the luminance of the subject of principal photographic interest in a scene to be photographed;
timing means electrically coupled to said forming means for a measure of an interval of time corresponding to the control signal;
switching means, electrically coupled to said timing means, having the duration of its conducting state controlled by the time interval measure;
power source means for providing flash energy; and
flash discharge means coupled by way of said switching means to said power source means;
wherein said first photoresponsive element of said photoresponsive means is responsive to the brightness of the subject and said second photoresponsive element is formed around the first element and is responsive to the brightness of the background of the subject;
and wherein said photoresponsive means is further provided with a transfer means for selectively operating the photoresponsive element responsive to the subject and the photoresponsive element responsive to the background.

25. An exposure control system for a camera employing a supplementary light illumination device having a flash lighting source for providing an appropriate exposure for a scene object which is illuminated by an external light, comprising:
a camera diaphragm device;
a diaphragm aperture adjusting means operatively coupled with said diaphragm device for controlling a diaphragm aperture value;
a shutter device, said shutter device including photoelectric means arranged to be uniformly sensitive to the light of a scene object to provide an electrical output corresponding to the brightness of a scene object;
means for determining shutter speed being connected with said shutter device to provide a predetermined value for the shutter speed and the film sensitivity;
a first operational means having an input responsive to said shutter speed means and said photoelectric means, and having an output coupled to said diaphragm aperture adjusting means, for determining said diaphragm value so as to provide an appropriate exposure corresponding to the brightness of a scene object and the determined shutter speed;
a second photoelectric means arranged to be sensitive to only the light from the main portion of a scene object for providing an electrical output by sensing the light from said main portion;
a distance setting means for generating an electrical output corresponding to the distance to a scene object; and
a second operational means coupled to said diaphragm aperture adjusting means and having a means for generating an electrical output corresponding to the determined value of said diaphragm aperture adjusting means and being coupled to said second photoelectric means and said distance setting means for controlling the amount of light of supplementary illumination which provides an appropriate exposure to the main portion of a scene object corresponding to the distance to a scene object, a diaphragm aperture and the brightness at the main portion of a scene object;
whereby an appropriate exposure is provided for the main portion and other portions of a scene object based on illumination of external light and to the main portion of a scene object based on illumination of a supplementary light corresponding to the preset shutter speed respectively;

wherein said first operational means includes a variable resistor for varying the resistance value thereof to be interlocking with the shutter operating means, and a metering means connected electrically with said variable resistor and the first photoelectric means, and provided with a metering pointer which is connected operatively with said diaphragm aperture adjusting means for adjusting the diaphragm aperture value corresponding to the deflection angle of said pointer.

26. An exposure control system for a camera employing a supplementary light illumination device having a flash lighting source for providing an appropriate exposure for a scene object which is illuminated by an external light, comprising:

a camera diaphragm device;

a diaphragm aperture adjusting means operatively coupled with said diaphragm device for controlling a diaphragm aperture value;

a shutter device, said shutter device including photoelectric means arranged to be uniformly sensitive to the light of a scene object to provide an electrical output corresponding to the brightness of a scene object;

means for determining shutter speed being connected with said shutter device to provide a predetermined value for the shutter speed and the film sensitivity;

a first operational means having an input responsive to said shutter speed means and said photoelectric means, and having an output coupled to said diaphragm aperture adjusting means, for determining said diaphragm value so as to provide an appropriate exposure corresponding to the brightness of a scene object and the determined shutter speed;

a second photoelectric means arranged to be sensitive to only the light from the main portion of a scene object for providing an electrical output by sensing the light from said main portion;

a distance setting means for generating an electrical output corresponding to the distance to a scene object; and a second operational means coupled to said diaphragm aperture adjusting means and having a means for generating an electrical output corresponding to the determined value of said diaphragm aperture adjusting means and being coupled to said second photoelectric means and said distance setting means for controlling the amount of light of supplementary illumination which provides an appropriate exposure to the main portion of a scene object corresponding to the distance to a scene object, a diaphragm aperture and the brightness at the main portion of a scene object;

whereby an appropriate exposure is provided for the main portion and other portions of a scene object based on illumination of external light and to the main portion of a scene object based on illumination of a supplementary light corresponding to the preset shutter speed respectively;

wherein said first operational means includes a variable resistor for varying the resistance value thereof to be interlocking with the shutter operating means, and a metering means connected electrically with said variable resistor and the first photoelectric means, and provided with a metering pointer which is connected operatively with said diaphragm aperture adjusting means for adjusting the diaphragm aperture value corresponding to the deflection angle of said pointer;

and wherein said first operational means further includes a switching means for a photographing mode, and wherein said distance setting means has a second variable resistor for selectively changing said first photoelectric means and said second variable resistor through said switching means.

27. An exposure control system for a camera equipped with a supplementary light illumination device having a flash light source for providing an appropriate exposure to a scene object which is illuminated by an external light, comprising:

a photoelectric means for sensing the light from at least one portion of a scene object and for converting said sensed light into an electric signal;

a shutter device;

a starting means interlocked with said shutter device for actuating said supplementary illumination device to emit light just before the closing of the shutter;

an integration circuit, connected with said photoelectric means, to commence integration action interlocked with release action of said shutter device;

a control circuit coupled to said integration circuit for generating a signal to discontinue flash lighting;

a switching means responsive to the output of said control circuit wherein the conduction of said switching means is controlled by the output of said control circuit, said switching means being effective to discontinue the flashing of said flash light source, whereby an external light exposure is effected by an exposure through the shutter opening and a supplemented light exposure is effected by lighting of the supplementary illumination device to provide an appropriate exposure uniformly to a scene object;

wherein said starting means includes a photoelectric delay circuit; and wherein said photoelectric delay circuit includes a second photoelectric means for sensing the light of a scene object and a time constant circuit coupled to the second photoelectric means for generating an electricaloutput corresponding to the light of a scene object having a condenser connected with said second photoelectric means, and an electromagnetic device connected with the output of said second photoelectric means for controlling the closing action of said shutter device.

28. An exposure control system for a camera employed together with an auxiliary light illumination device having a flash light source for taking a photograph, comprising:

a camera-associated portion including:

a shutter device for setting and determining an exposure time for photographing;

a preset shutter interval adjusting means connected with said shutter device and capable of presetting a shutter interval prior to photographing;

a diaphragm device which provides variable exposure openings;

a diaphragm aperture adjusting means connected with said diaphragm device and adjustable for setting the aperture value of the diaphragm;

a photosensitive means for uniformly sensing the light flux from a scene object, said photosensitive means having a photoelectric element for generating an electrical output corresponding to the amount of said senses light flux;

a distance information setting means having an input means for generating an electrical output corresponding to the distance to a scene object from a camera, and a diaphragm aperture operation means connected with said preset shutter adjusting means and said photosensitive means for generating an output corresponding to a diaphragm aperture value which provides an appropriate exposure corresponding to preset shutter value and the output of each of said means, and is further connected with said diaphragm aperture adjusting means to be adjustable for said diaphragm device corresponding to said output; and a means connected with said diaphragm aperture adjusting means for generating an electric signal corresponding to a diaphragm aperture adjusted value;

an auxiliary light illumination portion including:

a flash light source;

a power source means for supplying energy;

a switching means connected with both said flash light source and a power source means for controlling the opening and closing actions thereof to ultimately control the amount of light energy emitted;

a trigger means connected operatively with said shutter device for transmitting a trigger signal to said flash light source; and a circuit means for generating a signal to control the flash light amount and being provided with a control input terminal connected electrically with said distance information input means and said electric signal generating means, said circuit means also provided with a control output terminal connected with said switching means for discontinuing flashing of the flash light source through said switching means after emitting an amount of light corresponding to the distance setting information as well as the diaphragm aperture adjusted value;

and wherein said distance information input means is provided with a variable resistance means, the resistance value thereof being variable and corresponding to the distance to a scene object.

29. An exposure control system for a camera employed together with an auxiliary light illumination device having a flash light source for taking a photograph, comprising:

a camera-associated portion including:

a shutter device for setting and determining an exposure time for photographing;

a preset shutter interval adjusting means connected with said shutter device and capable of presetting a shutter interval prior to photographing;

a diaphragm device which provides variable exposure openings;

a diaphragm aperture adjusting means connected with said diaphragm device and adjustable for setting the aperture value of the diaphragm;

a photosensitive means for uniformly sensing the light flux from a scene object, said photosensitive means having a photoelectric element for generating an electrical output corresponding to the amount of said sensed light flux;

a distance information setting means having an input means for generating an electrical output corresponding to the distance to a scene object from a camera; and a diaphragm aperture operation means connected with said preset shutter adjusting means and said photosensitive means for generating an output corresponding to a diaphragm aperture value which provides an appropriate exposure corresponding to preset shutter value and the output of each of said means, and is further connected with said diaphragm aperture adjusting means to be adjustable for said diaphragm device corresponding to said output; and a means connected with said diaphragm aperture adjusting means for generating an electric signal corresponding to a diaphragm aperture adjusted value;

an auxiliary light illumination portion including:

a flash light source;

a power source means for supplying energy;

a switching means connected with both said flash light source and power source means for controlling the opening and closing actions thereof to ultimately control the amount of light energy emitted;

a trigger means equipped with a switching means and connected operatively with said shutter device for transmitting a trigger signal to said flash light source which is adapted to start flashing light; and a circuit means for generating a signal to control the flash light amount and being provided with a control input terminal connected electrically with said distance information input means and said electrical signal generating means, said circuit means also provided with a control output terminal connected with said switching means for discontinuing flashing of the flash light source through said switching means after emitting an amount of light corresponding to the distance setting information as well as the diaphragm aperture adjusted value; and wherein said distance information input means is provided with a variable resistance means, the resistance value thereof being variable and corresponding to the distance to a scene object; and wherein said distance information input means is further provided with a photoelectric means arranged for sensing the light flux from the main portion of a scene object, said photoelectric means being connected electrically in parallel with said variable resistance means.

30. An exposure control system for a camera employed together with an auxiliary light illumination device having a flash light source for taking a photograph, comprising:

a camera-associated portion including:

a shutter device for setting and determining and exposure time for photographing;

a preset shutter interval adjusting means connected with said shutter device and capable of presetting a shutter interval prior to photographing;

a diaphragm device which provides variable exposure openings;

a diaphragm aperture adjusting means connected with said diaphragm device and adjustable for setting the aperture value of the diaphragm;

a photosensitive means for uniformly sensing the light flux from a scene object, said photosensitive means having a photoelectric element for generating an electrical output corresponding to the amount of said sensed light flux;

a distance information setting means having an electrical output corresponding to the distance to a scent object from a camera, and a diaphragm aperture operation means connected with said preset shutter adjusting means and said photosensitive means for generating an output corresponding to a diaphragm aperture value which provides an appropriate exposure corresponding to preset shutter value and the output of each of said means, and is further connected with said diaphragm aperture adjusting means to be adjustable for said diaphragm device corresponding to said output; and means connected with said diaphragm aperture adjusting means for generating an electric signal corresponding to a diaphragm aperture adjusted value;

an auxiliary light illumination portion including:

a flash light source;

a power source means for supplying energy;

a switching means connected with both said flash light source and power source means for controlling the opening and closing actions thereof to ultimately control the amount of light energy emitted;

a trigger means connected operatively with said shutter device for transmitting a trigger signal to said flash light source; and a circuit means for generating a signal to control the flash light amount and being provided with a control input terminal connected electrically with said distance information input means and said electric signal generating means, said circuit means also provided with a control output terminal connected with said switching means for discontinuing flashing of the flash light source through said switching means after emitting an amount of light corresponding to the distance information as well as the diaphragm aperture adjusted value;

wherein said distance information input means is a variable resistance means which is variable corresponding to the distance between a scene object and a camera, and said control signal generating circuit means is a second variable resistance means which is variable corresponding to the diaphragm aperture adjusted value, and wherein said control signal generating circuit means is provided with a comparison circuit, the comparative inputs of which are connected with said first and second variable resistors respectively; and wherein said distance information input means further includes:

a photoelectric element having a photosenstive surface connected in parallel with the first variable resistor for directing its photosensitive surface so as to receive reflected rays of illumination of light supplied to a scene object, and a condenser connected with said photoelectric element.

31. An exposure control system for a camera employed together with an auxiliary light illumination device having a flash light source for taking a photograph comprising:

A. the illumination device including:

a power source means connected with the flash light source for supplying energy thereto, a trigger means connected operatively with the light source means for starting illumination thereof, said power source means having a characteristic of applying an approximately predetermined amount of electric energy to the light source means for generating a corresponding flash light thereby;

a light control circuit coupled to the power source for variably adjusting the light quantity;

means for forming a control signal in accordance with the distance to the scene to be photographed, the forming means being connected with the light control circuit so as to adjust the light quantity of the light source corresponding to the distance;

B. the camera including:

a diaphragm device which provides variable exposure openings;

a photosensitive means for sensing the light flux from a scene object, the photosensitive means having a photoelectric element for forming an electric output corresponding to the amount of the sensed light flux;

C. exposure control circuit means coupled to the photosensitive means for computing the exposure aperture of the diaphragm corresponding to a circuit parameter derived for the photosensitive means, the control circuit means including:

second means for forming a control signal representative of a given aperture value of the diaphragm device which is determined by the predetermined amount of electric energy of the power source means;

a change-over means selectively connectable with one of the photosensitive means and the second forming means;

a computing circuit connectable with one of the photosensitive means and the second forming means through the change-over means; and a diaphragm aperture adjusting means operatively coupled with the diaphragm device for adjusting a diaphragm aperture value automatically, the adjusting means connected with the computing circuit, whereby the aperture of the diaphragm device is automatically set for proper exposure under flash photography; and wherein a diaphragm aperture indicating means is connected with the computing circuit whereby the aperture value of the diaphragm device is indicated by the indicating means under flash photography.

32. An exposure control system for a camera employed together with an auxiliary light illumination device having a flash light source for taking a photograph comprising:

diaphragm device which provides variable exposure openings;

means for adjusting the diaphragm device, operatively connected with the diaphragm device;

shutter device for defining and exposure duration through the opening and closing thereof;

means for adjusting the exposure duration of the shutter device coupled to the shutter device;

a photosensitive means for sensing scene light from an object to be photographed, the photosensitive means having a photoelectric element for forming an electric output corresponding to the amount of the sensed light;

exposure control circuit means coupled to the photosensitive means for computing the opening of the diaphragm device corresponding to the output of the photosensitive means, the circuit means being operatively coupled to the diaphragm adjusting means, manually operable means for effecting a preselection of the shutter duration or the diaphragm opening;

electrical signal forming means, coupled operatively to the diaphragm adjusting means for forming the signal corresponding to the adjusted diaphragm opening of the diaphragm device; and light control means coupled to the electrical signal forming means for variably adjusting the flash light quantity corresponding, at least, to the adjusted diaphragm opening in flash photography; and in which the manually operable means includes an adjusting ring having a shutter preselection mark and a diaphragm preselection mark and a control stop portion operatively associated with the diaphragm device when the diaphragm preselection mark is selected.

* * * * *